(12) United States Patent
Mudhelli

(10) Patent No.: US 11,410,101 B2
(45) Date of Patent: Aug. 9, 2022

(54) EFFICIENT ANALYSIS OF USER-RELATED DATA FOR DETERMINING USAGE OF ENTERPRISE RESOURCE SYSTEMS

(71) Applicant: ServiceNow, Inc., Santa Clara, CA (US)

(72) Inventor: Prashanth Mudhelli, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 300 days.

(21) Appl. No.: 16/249,709

(22) Filed: Jan. 16, 2019

(65) Prior Publication Data
US 2020/0226517 A1    Jul. 16, 2020

(51) Int. Cl.
*G06Q 10/06* (2012.01)
*G06Q 50/18* (2012.01)
*G06F 16/9038* (2019.01)
*H04L 67/306* (2022.01)
(Continued)

(52) U.S. Cl.
CPC ... *G06Q 10/06313* (2013.01); *G06F 16/9038* (2019.01); *G06Q 50/184* (2013.01); *H04L 63/101* (2013.01); *H04L 63/105* (2013.01); *H04L 67/2833* (2013.01); *H04L 67/306* (2013.01)

(58) Field of Classification Search
CPC ............ G06Q 10/06313; G06Q 50/184; G06F 16/9038; H04L 63/101; H04L 63/105; H04L 67/2833; H04L 67/306
See application file for complete search history.

(56) References Cited

U.S. PATENT DOCUMENTS

| 5,761,445 A * | 6/1998 | Nguyen | ................ | G06F 13/362 710/100 |
| 6,321,229 B1 | 11/2001 | Goldman | | |
| 6,609,122 B1 | 8/2003 | Ensor | | |

(Continued)

OTHER PUBLICATIONS

Centralized end-to-end identity and access management and ERP systems; Marianne Bradford; 2014; International Journal of Accounting Information Systems (Year: 2014).*

(Continued)

*Primary Examiner* — Brian M Epstein
*Assistant Examiner* — Francis Z. Santiago Merced
(74) *Attorney, Agent, or Firm* — Fletcher Yoder PC

(57) ABSTRACT

An example embodiment may involve a software application executable on a computing device of a computational instance of a remote network management platform associated with a managed network. The managed network may contain an enterprise resource planning (ERP) system comprised of computing devices of the managed network on which ERP software is executable. The managed network may be granted a number of authorizations to access the ERP system and capabilities thereof. The ERP system may store user-related data for individual users of the managed network who access the ERP system. The software application may communicate with one or more of the ERP clients to access the user-related data, use a set of compliance criteria to identify, within the user-related data, a set of users, and store in memory an indication identifying the set of users as a potential source of non-compliance with the number of authorizations.

20 Claims, 12 Drawing Sheets

(51) Int. Cl.
    *H04L 67/566* (2022.01)
    *H04L 9/40* (2022.01)

(56) References Cited

U.S. PATENT DOCUMENTS

| | | |
|---|---|---|
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2004/0260589 A1* | 12/2004 | Varadarajan ...... G06Q 10/06312 705/7.33 |
| 2006/0026586 A1* | 2/2006 | Remmel .................... G06F 8/71 717/121 |
| 2006/0160059 A1* | 7/2006 | Dompier .................. G09B 7/02 434/362 |
| 2008/0148346 A1* | 6/2008 | Gill .......................... H04L 63/20 726/1 |
| 2010/0030845 A1* | 2/2010 | Junghans .............. G06F 16/217 709/203 |
| 2011/0066562 A1* | 3/2011 | Stapleton ............... G06Q 10/00 705/317 |
| 2018/0349197 A1* | 12/2018 | Eda ........................ G06F 9/5055 |
| 2019/0347346 A1* | 11/2019 | Tiwary ................ G06F 21/6218 |

OTHER PUBLICATIONS

"User Types in SAP", saponlinetutorials.com/user-types-sap, Accessed Jan. 3, 2019, 3 pages.
"SAP Architecture", tutorialspoint.com/sap/sap_architecture, Accessed Jan. 3, 2019, 5 pages.
"SAP Licensing Guide", SAP, Jul. 2018, 20 pages.

* cited by examiner

EFFICIENT ANALYSIS OF USER-RELATED DATA FOR DETERMINING USAGE OF ENTERPRISE RESOURCE SYSTEMS

BACKGROUND

An enterprise may license software and install the licensed software on various computing devices in the enterprise's managed network. In order to comply with license rights associated with the licensed software, it can be desirable for the enterprise to keep track of where and how the licensed software is used in the managed network. However, tracking use and detecting mismanagement or misuse of licensed software can be difficult, particularly when a large number of users and devices in the managed network are using the licensed software and/or when the licensed software is licensed in accordance with a complex licensing model.

SUMMARY

An example of licensed software is software is enterprise resource planning (ERP) software, which can take the form of one software application or suite of software applications that are configured for use by an enterprise in collecting, storing, managing, and interpreting data related to a variety of enterprise operations, such as human resources, finance, information technology, supply chain, customer relationship management, or other operations that are unique to the enterprise.

ERP software can be installed on and executed by multiple computing devices within the enterprise's managed network. In particular, the managed network can contain multiple "ERP clients," each of which takes the form of one or more computing devices of the managed network on which the ERP software is installed. Each ERP client can have its own data that is collected, stored, managed, etc., in accordance with the services provided by the ERP software. In addition, each ERP client can be configured to store, in the ERP client's database, license data listing individual users whom are licensed to access the ERP client and the access capabilities of these users (e.g., the capabilities of the ERP software that the users' respective licenses authorize the users to access and use).

The enterprise can be granted a number of licenses to access the ERP system. However, tracking compliance with ERP software licenses can present various challenges. For example, it can be a complex, unworkable, and time consuming process, particularly when the managed network includes large quantities (e.g., hundreds) of ERP clients distributed across multiple physical sites and large quantities (e.g., hundreds or thousands) of individual users. In addition, ERP software license allocation can frequently change as the enterprise changes, and it can be difficult to track all such changes in an efficient, concise manner. Due to the size of the managed network, the frequent changes to the enterprise, and/or other reasons, the enterprise might find itself intentionally or inadvertently mismanaging or misusing its ERP software licenses.

To address these issues, the methods and systems described herein dynamically analyze license data using criteria corresponding to specific non-compliance scenarios associated with the ERP software.

Accordingly, a first example embodiment may involve a software application executable on a computing device of a computational instance of a remote network management platform associated with a managed network. The managed network may contain an ERP system comprised of a plurality of ERP clients. Each ERP client may be associated with one or more computing devices of the managed network on which ERP software is executable. The managed network may be granted a number of authorizations to access the ERP system and capabilities thereof. The ERP system may store user-related data containing a list of identifiers of individual users of the managed network who access the ERP system and the capabilities thereof.

The software application may communicate with one or more of the ERP clients to access the user-related data. The software application may also use a set of compliance criteria to identify, within the user-related data, a set of users comprising (i) users who engage in a first type of communication with the ERP system without having been allocated authorization associated with the first type of communication, (ii) users who engage in a second type of communication with the ERP system not requiring authorization, but who have been allocated authorization to access the ERP system, (iii) users who access a type of ERP client that does not require authorization to access, (iv) users who are restricted from accessing the ERP system, and (v) users who have not accessed the ERP system in over a threshold time period. The software application may also store in memory an indication that identifies the set of users as a potential source of non-compliance with the number of authorizations granted to the managed network.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
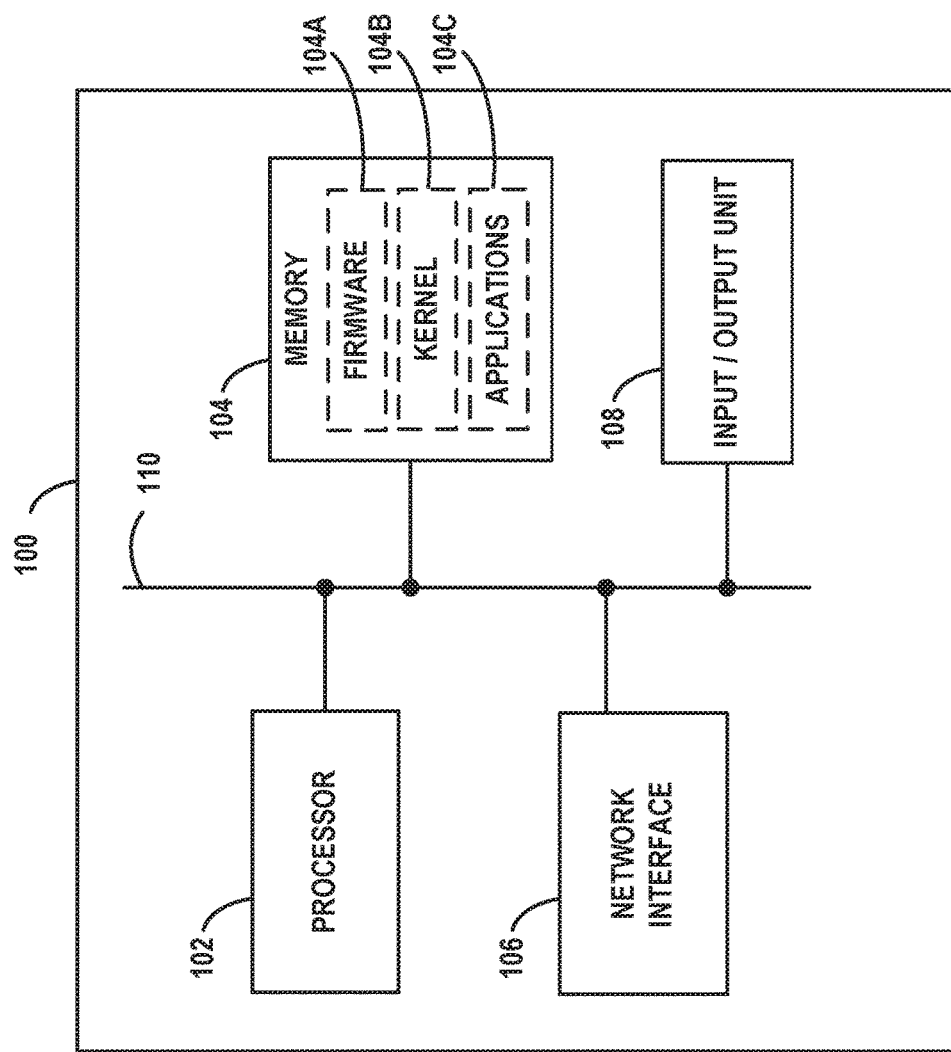
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
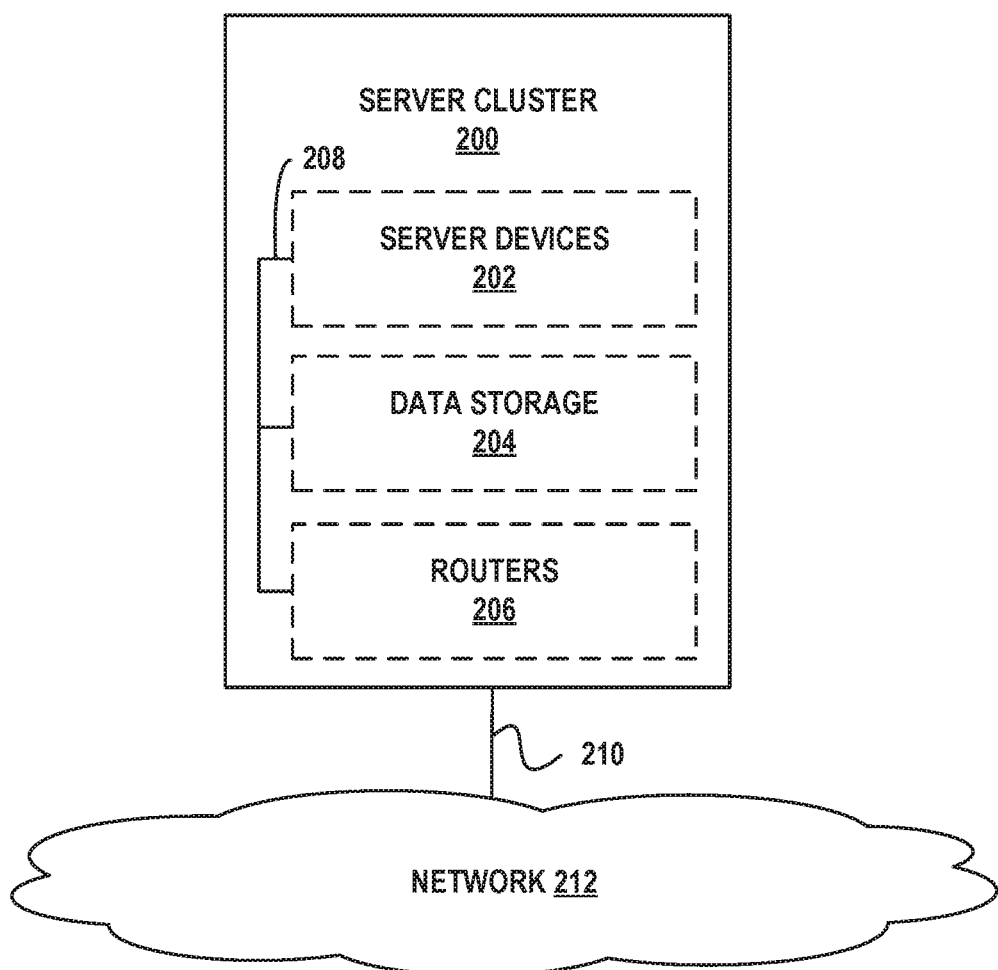
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
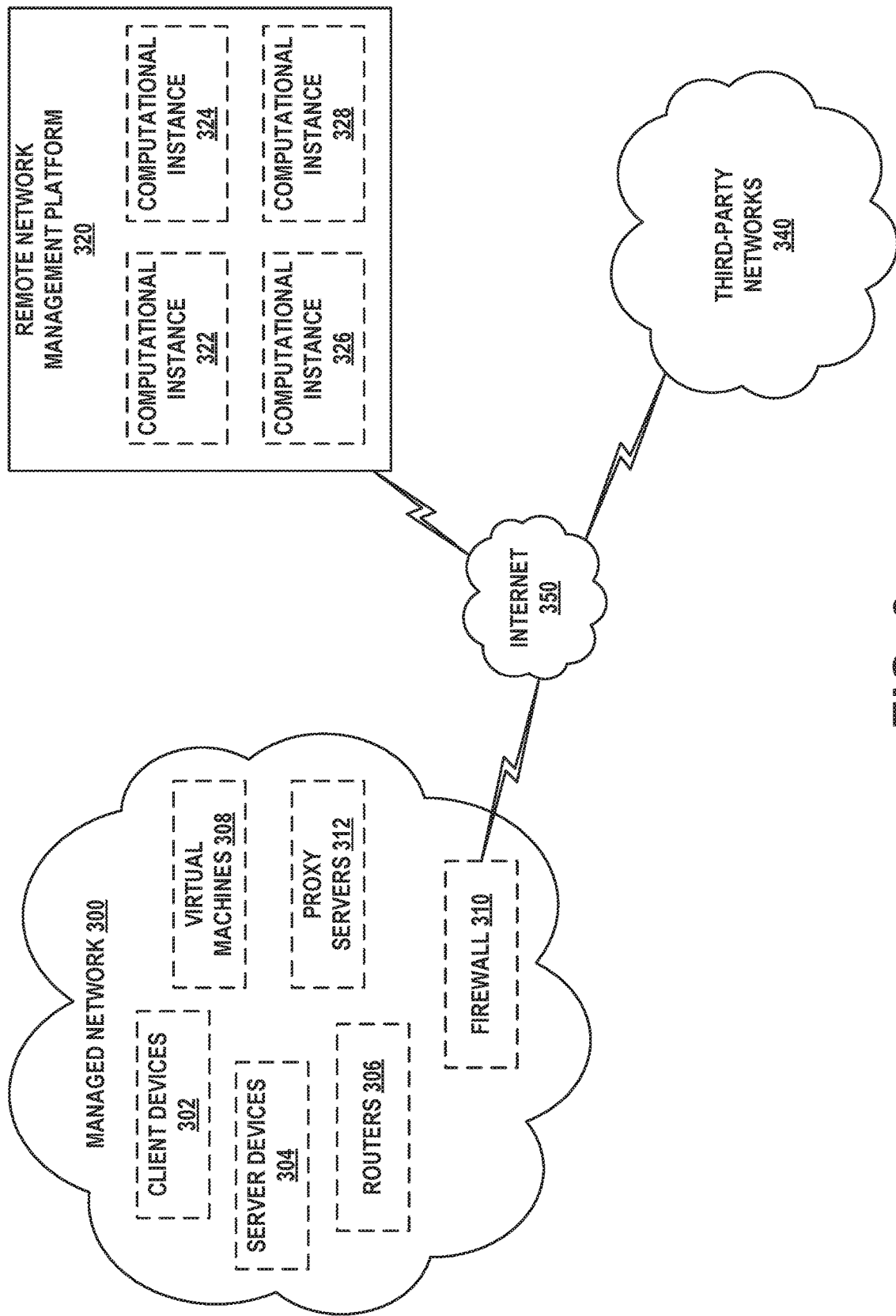
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
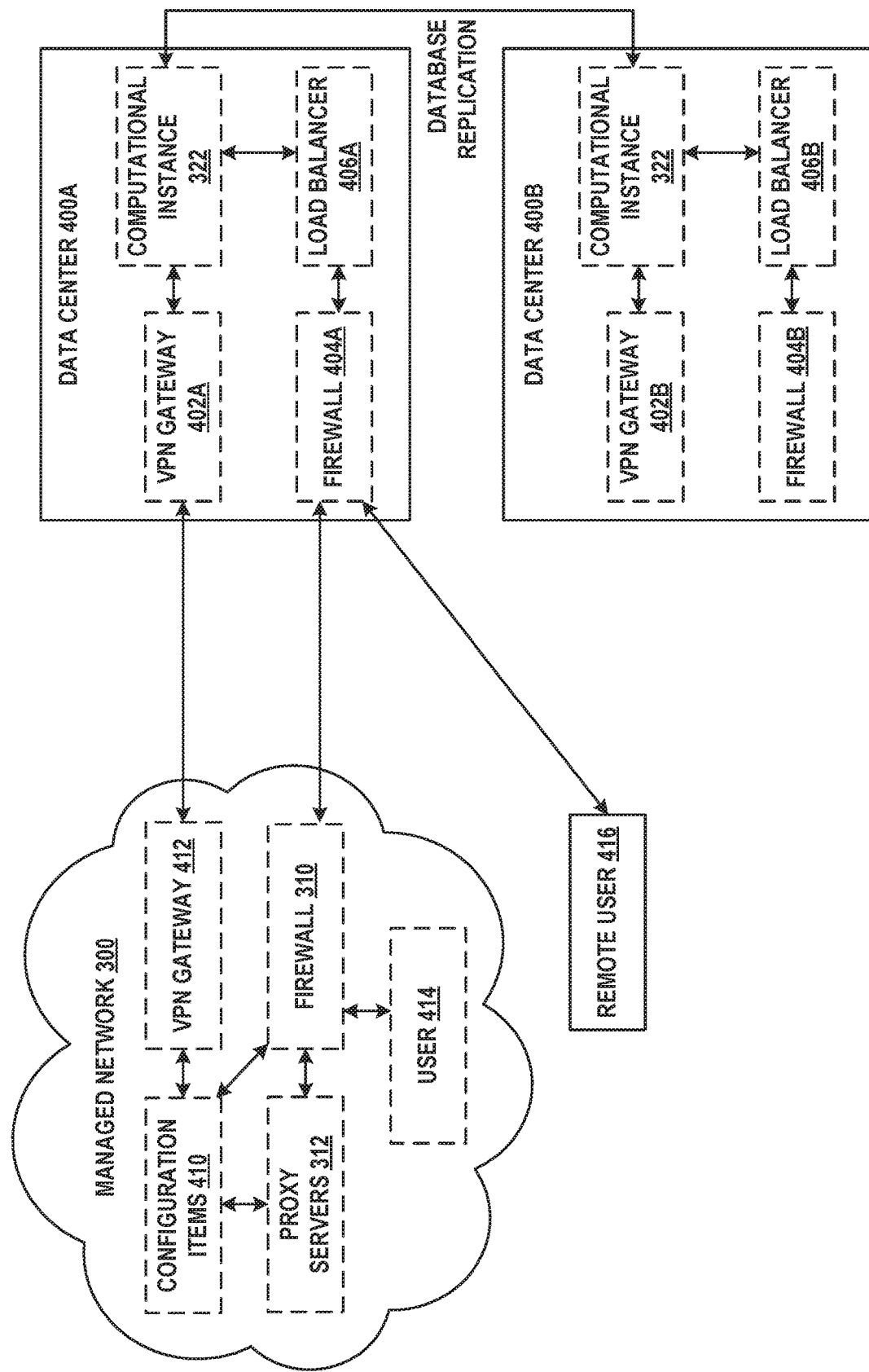
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-

10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
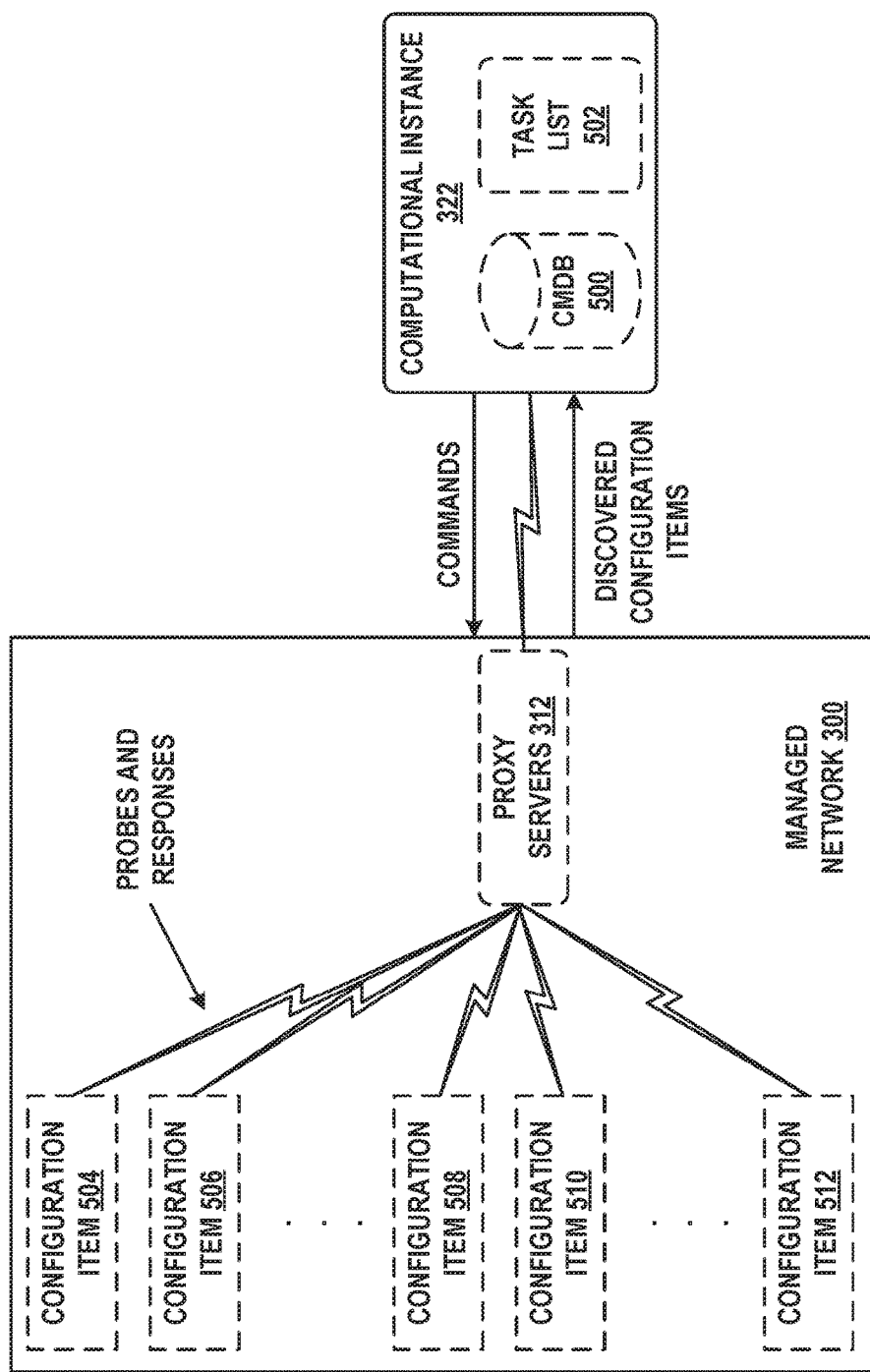
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
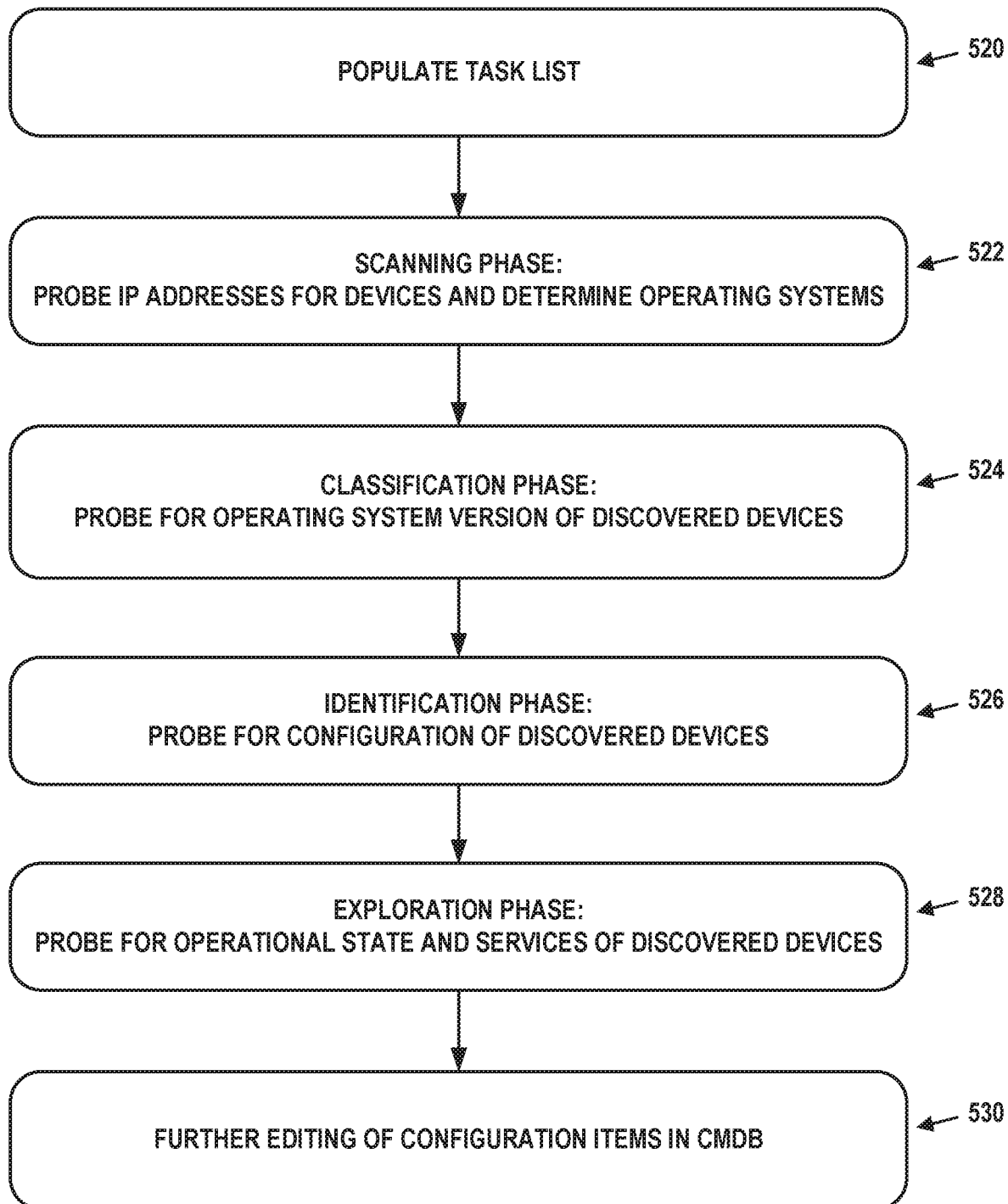
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Licensed Enterprise Resource Planning System

While some software applications used by managed network 300 may be hosted by an aPaaS system, as described above in relation to FIGS. 1 through 4, others may be installed on the individual computing, client, and/or server devices of managed network 300. Such software is often proprietary, and may be licensed in various ways, such as per user, per processor, per processor core, per computing device, based on one or more metrics, and/or in other manners. An example of such software is enterprise resource planning (ERP) software, which can take the form of one software application or suite of software applications that are configured for use by an enterprise in collecting, storing, managing, and interpreting data related to a variety of enterprise operations, such as HR, finance, IT, or other operations that are unique to the enterprise. The following description primarily relates to ERP software, but can also apply to other types of proprietary software that can be installed on devices in managed network 300.

ERP software can be installed on and executed by multiple computing devices within managed network 300. This ERP software, along with the multiple computing devices of managed network 300 on which the ERP software is installed, can be collectively referred to as an "ERP system."

The ERP system can include multiple, logically discrete subsystems, or "ERP clients." Each ERP client can include one or more computing devices within managed network 300 on which ERP software is installed. Further, each ERP client can have its own data that is collected, stored, managed, etc. The data for a particular ERP client can include data created, stored, etc. for the ERP client that is accessible to other ERP clients and/or data created, stored, etc. for the ERP client that is not accessible to other ERP clients.

Figure 6:
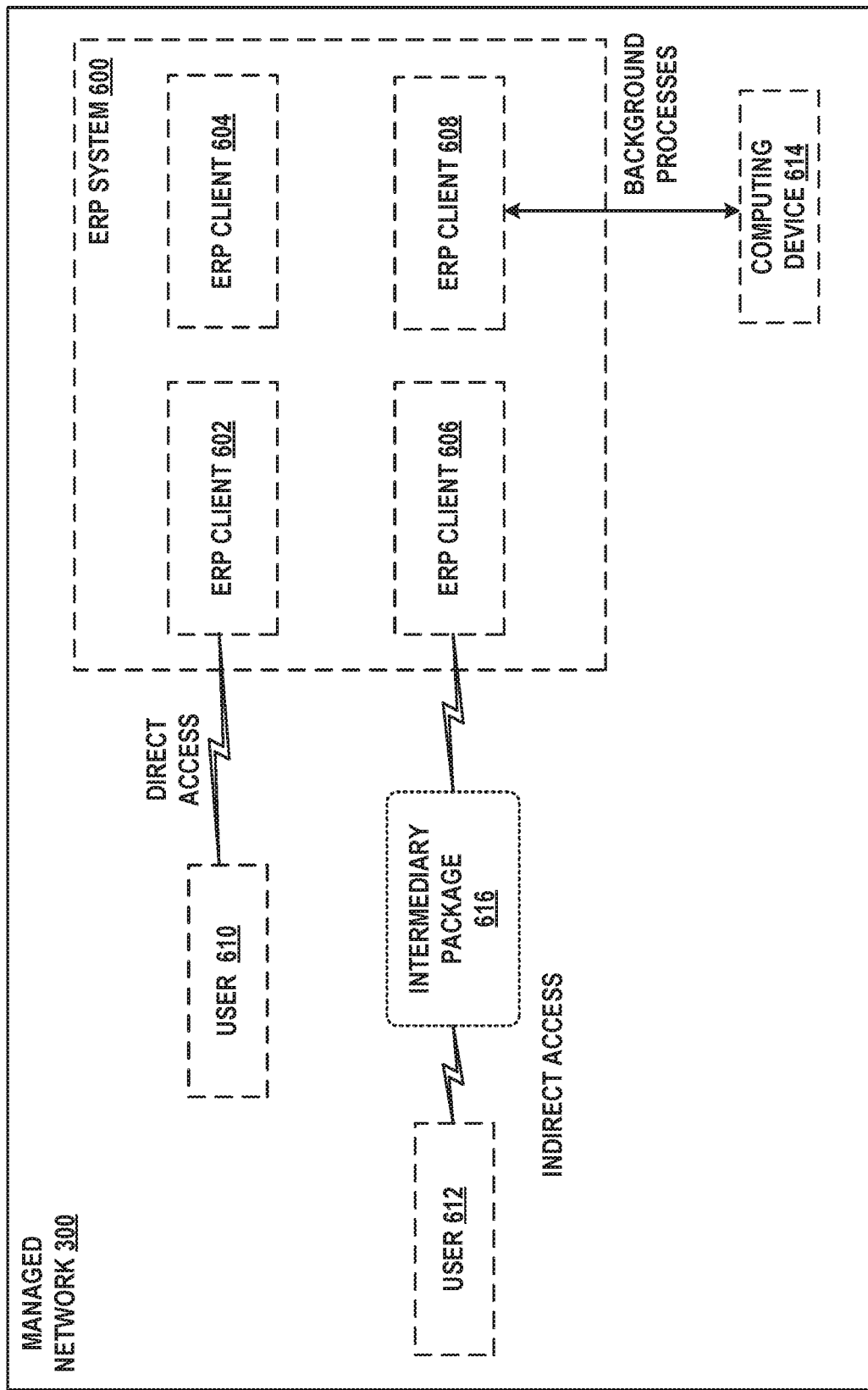
FIG. 6 shows an example ERP system, in accordance with example embodiments.

FIG. 6 shows an example ERP system 600 within managed network 300. As shown, the ERP system 600 includes four ERP clients—namely, ERP client 602, ERP client 604, ERP client 606, and ERP client 608. Each ERP client can include one or more computing devices and one or more databases in which data is stored for the ERP client. For simplicity, such computing devices and databases are not shown in FIG. 6.

Each ERP client of an ERP system can be dedicated for use in carrying out particular activities. As noted above, ERP software may facilitate HR, finance, IT, supply chain, and customer relationship management operations, to name just a few uses. But individual ERP clients can have more specific functions as well. For example, an ERP client can be a training client dedicated to training users how to access and use ERP software or a development client dedicated to developing software applications that are executable in accordance with the ERP system. In some implementations, the ERP software can provide a unique programming language, developed by the provider of the ERP software for use by enterprises in developing and testing software applications, and/or can be configured to recognize other programming languages. Other example ERP clients can include a testing client dedicated to testing developed applications and a production client dedicated to the live operation of tested/deployed applications as well as the live operation of other services that the ERP software provides. ERP clients can be dedicated to other activities as well. In some cases, activities performed in one ERP client can be performed independently from activities performed in another ERP client and without affecting the data of the other ERP client. For example, applications being tested on a testing client might not be accessible to users logged on to a production client.

Additionally or alternatively to being dedicated for use in carrying out particular activities, an ERP client (or group of ERP clients) can be dedicated for use by a particular entity or entities within the enterprise. For example, an ERP client can be dedicated to a particular department of the enterprise, such an IT department or an HR department, or can be dedicated to a particular geographic location of the enterprise, such as one ERP client for a branch of the enterprise operating in Europe, and another ERP client for a branch of the enterprise operating in North America.

A user can access an ERP client by way of an end-user device—that is, a computing device that can access or otherwise communicate with one or more ERP clients of the ERP system 600. For example, an end-user device can be one of the client devices 302 shown in FIG. 3. These end-user devices are not shown in FIG. 6 for purposes of simplicity.

When a user accesses an ERP client, a communication session (also referred to herein as a "session") can be established and conducted via a connection between an end-user device and the ERP client. During such a session, the end-user device can receive data stored in a database associated with the ERP client, transmit data to the ERP client for the ERP client to write to the database, or perform other actions. Further, the ERP client can be configured to collect and store, in the database, records of such sessions. These records can include a variety of information associated with the sessions and the end-user devices and users involved in the sessions, including but not limited to network addresses (e.g., IP addresses) of the end-user devices, user identifiers, and/or other user information.

An ERP client can be accessed in various ways. For example, a user can access the ERP client directly by way of a graphical user interface (GUI) delivered with or as part of the ERP system. The GUI can be provided as part of a software application developed by the provider of the ERP software and installed on an end-user device, and a user can use the GUI to log on to access the ERP client. As shown in FIG. 6, user 610 is directly accessing ERP client 602, perhaps by way of a GUI.

Alternatively, a user can access the ERP client indirectly by way of an "intermediary package," such as an intermediary software application or intermediary platform, that is not part of the ERP system but that has an integration with the ERP system. For example, a user having an account associated with the intermediary package can access an ERP client via the intermediary package. Such an intermediary package can include software custom-built by the enterprise and/or software developed by a third-party. Further, this intermediary package can be executable by one or more computing devices associated with managed network 300 or elsewhere (e.g., a computing device outside of managed network 300). In an example managed network, for instance, an HR department may use HR software supporting integration with an ERP client that is dedicated to the HR department. Similarly, an IT department may use IT software supporting integration with an ERP client that is dedicated to the IT department. As shown in FIG. 6, user 612 is indirectly accessing ERP client 606 by way of intermediary package 616.

To access an ERP client, a user is typically required to have a license. For example, if a user is directly or indirectly accessing an ERP client in the manners described above and then engaging in interactive communication with the ERP client, a license may be required. Thus, both user 610 and user 612 may require a license to access their respective ERP clients. However, other types of user communication with an ERP client are possible as well, some of which might not require a license. For example, a computing device within or outside of managed network 300 can be controlled by a user to perform, or can be configured to autonomously perform, various background processes involving the ERP system. Such background processes might or might not require a user to be logged on to the ERP system, and might not require a license. As shown in FIG. 6, computing device 614 is performing background processes with respect to ERP client 608.

An ERP client can be configured to store license data in its database. The license data can take the form of a table including a list of accounts for individual users whom are licensed to access the ERP client and respective access capabilities of the users. For example, an account for user 610 can be included on a list stored by ERP client 602 and an account for user 612 can be included on a list stored by ERP client 606. The table can include a variety of user-related data, including but not limited to a user identifier that is unique to the ERP system (e.g., the userid that the user logs on with), an email address of the user, the user's name, a user type (e.g., an indication of whether the user directly accesses the ERP client indirectly accesses the ERP client), a type of license allocated to the user (examples of which are provided in more detail below), a date from which the license is valid, a date through which the license is valid, a date/time at which the user last logged on to the ERP client, an indication of whether the user is a locked user (i.e., a user who is restricted from accessing the ERP client, such as a user who was previously employed by the enterprise), among other possibilities. In some implementations, a user authorized to access multiple different ERP clients might use the same userid for logging on to each ERP client. Alternatively, the user can have multiple different userids, one for each ERP client.

Further, an ERP client might also be configured to store, in its database, a table including a list of non-licensed users and/or computing devices who are authorized to access the ERP client. For example, computing device 614 can be included on a list stored by ERP client 608.

As noted above, a license allocated to an individual user can have a particular license type that defines which activities the user is authorized to perform using the ERP system. In some licensing arrangements, the type of license allocated to an individual user can range from a lowest level license to a highest level license, where the level of a license depends on one or more metrics, such as an operational role that the user has within the enterprise. For example, a higher level license can be allocated to a user having an administrative role—that is, an administrator with the authorization to perform certain activities for the benefit of the administrator as well as for the benefit lower level users (e.g., other employees of the enterprise). Such activities might include developing applications, managing user accounts, creating new databases and database tables, and managing stored data for the ERP client. On the other hand, a lower level license can be allocated to a non-administrative user within the enterprise, such as a user whose role might only involve performing activities for the user's own benefit and not on behalf of other users. Other examples of license types are possible as well.

With the above-described licensing arrangement, some higher level licenses and some lower level licenses can overlap in scope. That is, a higher level license might authorize a user to perform the same activity as a lower level license. For example, a lower level license can grant a non-administrative user permission to view data of an ERP client, but might not grant permission to edit the data. On the other hand, a higher level license can grant an administrative user permission to both view and edit the data of the ERP client. Thus, the administrative user does not need both a higher level license and a lower level license to view and edit the data, only the higher level license. Other examples are possible as well.

License levels can be defined by the provider of the ERP software and/or defined by the enterprise. One reason for having enterprise-defined license levels is to uniquely tailor a license to a particular user role within the enterprise, although there may be additional or alternative reasons for doing so as well.

Furthermore, in some licensing arrangements, for a user to access multiple ERP clients, the user can be required to have a separate license for each such ERP client. In some cases, one license allocated to the user for one ERP client might not be the same license type as another license allocated to the user for another ERP client. Alternatively, the license allocated to the user for each ERP client might have the same license type.

VI. Example Consolidation of User License Data

There are various approaches for software asset management in which an enterprise attempts to keep track of which of its computing devices and users are using licensed software and thus track to what degree software usage complies with software license rights held by managed network 300. Some of these approaches can be applied to licensed software in general, while others can be applied specifically to ERP software.

With respect to licensed software in general, the enterprise might attempt to maintain accurate software entitlement records (i.e., records that provide information about software license rights held by managed network 300). One way in which this might occur is by counting licenses and comparing the license count to a number of software installations within managed network 300. This can be performed on a cyclical basis, such as during audit cycles. Still, these and other approaches for licensed software in general can present challenges. For example, a large enterprise may use thousands of separate computing devices, each of which may use a set of software applications. Further, such computing devices may go in and out of service, or require different software applications over time. Still further, different versions or builds of each software application may be installed across these computing devices.

On the other hand, with respect to ERP software in particular, the enterprise might attempt to separately log on to each ERP client in the ERP system 600 to request that ERP client's stored list of accounts for licensed individual users. However, this approach can have drawbacks as well. For example, this approach might require that multiple licenses be allocated to a single user, or multiple licenses be allocated across multiple different users, so that such user(s) are authorized to log on to the ERP clients and retrieve the license data stored at those ERP clients. In addition, the enterprise might utilize a computing system outside of the ERP system 600, such as remote network management platform 320, and create a separate external connection (i.e., a connection that does not exist solely within the ERP system 600) between the computing system and each ERP client over which the computing system can retrieve license data stored at that ERP client. Each such external connection can be a direct connection between the computing system and an ERP client, or can be a connection between the computing system and the ERP client via proxy servers 312.

Acquiring the authorization to log on to each ERP client, creating external connections to each ERP client, and independently retrieving the license data from each ERP client can be a time consuming and complex process to execute and manage, particularly when managed network 300 includes large quantities (e.g., hundreds) of ERP clients. Further, if an external interface provided by one or more ERP clients changes (e.g., a change in message flow and/or message content), the software applications used to access and retrieve license data from these ERP clients might have to be changed as well, which can be even more complex and time consuming when multiple external interfaces are used. Still further, if acquiring the proper authorization, creating the external connections, and retrieving the license data from each ERP client is done as a manual process, the process can be so slow that the license data will likely be out of date by the time all of the license data is collected due to the extent of ERP clients as well as the dynamic nature of the data.

In addition, if the enterprise decides to retrieve license data from less than all of the ERP clients in the ERP system 600, the enterprise might receive an incomplete picture of the licenses the enterprise holds, which is undesirable. One reason why an incomplete picture would result is that, as noted above, multiple licenses might be allocated to the same user for different ERP clients, and such licenses might be of the same or different license types. Thus, to more accurately track ERP software license compliance, the enterprise might be required to spend time going through the complex and unworkable approach described above.

If ERP software license compliance is not concisely and accurately tracked, an enterprise might risk being non-compliant with its licenses. Two example ways in which this can occur is license misuse and license mismanagement. License misuse can refer to scenarios where the enterprise and its associated users intentionally or unintentionally violate ERP software licenses, such as when the enterprise has purchased licenses for a particular number of users, but more than that number of users are accessing ERP software. License misuse can render the enterprise liable for additional license fees and can possibly place the enterprise at risk of penalties resulting from the misuse. On the other hand, license mismanagement can refer to a scenario where the enterprise might not be violating any ERP licenses, but rather might be paying for more licenses than the enterprise needs or might be paying for a higher level license when a lower level license would be sufficient for meeting the enterprise's needs. License mismanagement is particularly likely after merger and/or acquisition activities in which one enterprise merges with or acquires another enterprise. If both have legacy ERP system licenses, the combined enterprise may have numerous redundancies in these licenses, which the embodiments herein will rapidly discover.

Therefore, it is desirable for an enterprise to be able to efficiently collect and maintain accurate, up-to-date license data associated with ERP software, particularly as the enterprise's use of ERP software changes over time. Doing so is especially relevant when managed network 300 incudes large quantities (e.g., thousands) of computing devices, users, etc., when the ERP system 600 includes large quantities (e.g., hundreds) of ERP clients, or when there are large quantities of users that are each licensed to use one or more of the ERP clients.

Accordingly, the present disclosure provides a software application that collects, consolidates, and stores license data from each of the ERP clients in the ERP system 600. In particular, the software application can be deployed on one of the ERP clients of the ERP system 600, which will be referred to herein as the "central ERP client." The software application can be configured to cause the central ERP client to (i) establish a respective secure, internal connection (e.g., a connection existing between computing devices within the ERP system 600) with each of the other ERP clients, (ii) retrieve, over the internal connections, the respective license data stored at each ERP client, and (iii) store the license data in a database of the central ERP client.

Further, the software application can be configured to communicate with a computational instance of remote network management platform 320 over an external connection between the central ERP client and the computational instance, perhaps via proxy servers 312. The computational instance may provide a web portal or application, such as a software asset management portal or application, through which a user can log on to the central ERP client, establish the external connection with the central ERP client, and instruct the central ERP client to retrieve the license data from the other ERP clients. The computational instance can also receive the retrieved license data over the external connection. In some implementations, proxy servers 312 can retrieve the license data from the central ERP client and temporarily store the license data at proxy servers 312 before transmission of this license data to the computational instance.

The act of computational instance instructing the central ERP client to retrieve the license data from the other ERP clients and the act of the central ERP client sending the computational instance the retrieved license data can occur asynchronously. For example, a user can log on to the central ERP client and instruct the central ERP client to retrieve the license data from the other ERP clients and transmit the license data to the computational instance. Other activities can then take place on the computational instance while the process of the central ERP client retrieving the license data and transmitting the license data to the computational instance occurs in the background. Such a background process may take several minutes or hours, so the user may log off of the central ERP client while it is taking place, and then log in again later to view the results.

In some implementations, the software application can also be configured to cause the central ERP client to retrieve up-to-date license data from the other ERP clients on a periodic basis at a pre-scheduled time (e.g., daily, weekly, every night at 10:00 pm, within 24 hours before every audit cycle, etc.). Additionally or alternatively, a user can use the computational instance to schedule times at which the central ERP client is triggered to retrieve license data from the other ERP clients.

Implementations of this disclosure provide technological improvements that are particular to computer networks and computing systems, for example, managed computer networks such as managed network 300.

Computing network-specific technological problems, such as inefficiency, unreliability, and complexity of monitoring software license usage in managed networks—particularly large managed networks with hundreds or thousands of computing devices, software applications, and user activity thereon—can be wholly or partially solved by the implementations of this disclosure.

For example, implementations of this disclosure help reduce or eliminate the challenges presented by the above-described approaches. In particular, having the central ERP client retrieve all of the license data from other ERP clients via internal connections can reduce the number of external connections to the ERP system. For instance, hundreds of external connections might be involved in some approaches, but implementations of this disclosure involve as low as one external connection—namely, the external connection between the computational instance (e.g., by way of a proxy server) and the central ERP client. Thus, the time and complexity associated with creating, re-creating, and managing numerous external connections is reduced or eliminated. Other implementations of this disclosure might involve more than one external connection, but the total number of external connections might still be very low compared to the number of external connections in approaches.

Further, because the computational instance retrieves license data from the central ERP client over a small number of external connections (e.g., one connection), authorization to access the central ERP client and retrieve the license data might only need to be granted to a small number of users. For example, authorization to log on to the central ERP client might only be needed for a single account through which one or more users can access the license data.

Moreover, because implementations of this disclosure improve the manner in which the enterprise can collect and maintain ERP software license data, the undesirable consequences associated with mismanaging or misusing ERP software licenses can be reduced.

These and other improvements are described in more detail below, though the operations described below are for purposes of example and that implementations may provide other improvements as well.

Figure 7:
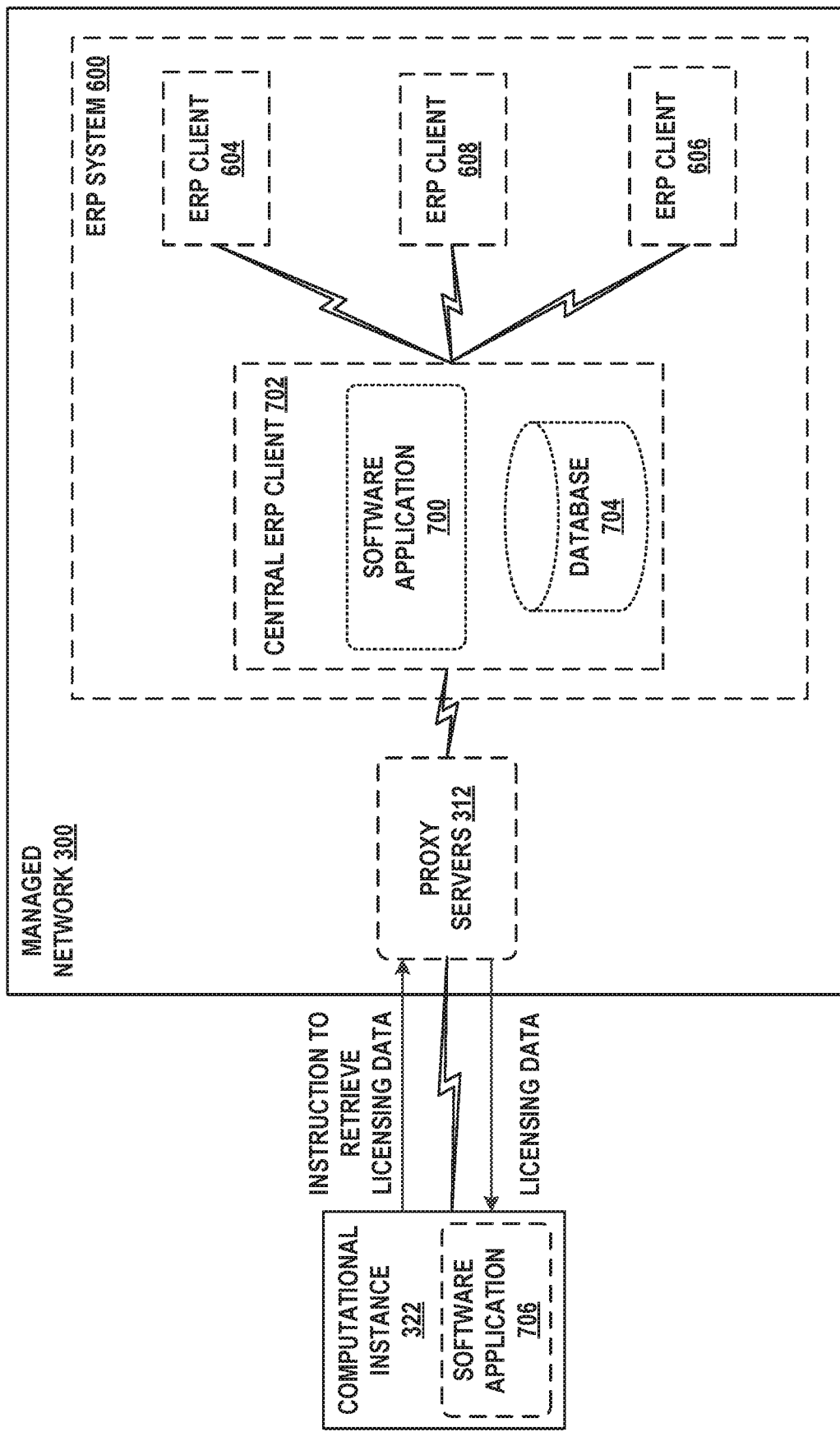
FIG. 7 depicts yet another communication environment involving a remote network management architecture, in accordance with example embodiments.

FIG. 7 illustrates an example communication environment in which a software application, software application 700, can collect and store license data from ERP clients in the ERP system 600. As shown, software application 700 is deployed on and executable on a central ERP client 702. The central ERP client 702 is a given one of the ERP clients—in this case, the ERP client formerly denoted as ERP client 602—that is selected to be the ERP client that hosts software application 700.

The central ERP client 702 also includes a database 704 in which software application 700 can store the license data retrieved from the other ERP clients, as well as the license data associated with the central ERP client 702 itself (i.e., a list of accounts of users licensed to access the central ERP client 702). In particular, the database 704 can include one or more tables, designated for access by the enterprise via computational instances of remote network management platform 320, in which license data from the ERP system 600 is consolidated and stored. The database 704 might include other tables as well, in which other types of data can be stored. With a single ERP client in which the license data from the ERP system 600 is stored, such as all the license data from all of the ERP clients, the enterprise does not need to access multiple databases and/or database tables across multiple ERP clients, thereby reducing the time and complexity associated with viewing and managing license data.

The central ERP client 702 is shown to be in communication with ERP client 604, ERP client 606, and ERP client 608. These three other ERP clients can represent all of the other ERP clients in the ERP system 600, or can represent less than all of the ERP clients in the ERP system 600. To retrieve the license data from ERP client 604, for instance, software application 700 can establish a connection and communicate with ERP client 604 in accordance with one or more application layer communication protocols. Such a protocol may define a process for establishing the connection, logging on to ERP client 604, carrying out a session in which data is exchanged between the central ERP client 702 and ERP client 604, and/or other aspects of the session. In an example session between the central ERP client 702 and ERP client 604, for instance, software application 700 can make a remote function call or series of function calls that causes ERP client 604 to execute instructions associated with the function call(s) and perform one or more operations defined by the instructions. The instructions can include, at a minimum, an instruction to transmit, to the central ERP client 702, a copy of the license data stored on ERP client 604. The central ERP client 702 can retrieve license data from ERP client 606 and ERP client 608 in a similar manner.

In some implementations, the one or more protocols may be proprietarily associated with the provider of the ERP software, and the central ERP client 702, other ERP clients of the ERP system 600, and/or other computing devices shown in FIG. 7, may be configured to communication according to the protocol(s). As a more particular example, the ERP system 600 may be a SAP® system and the protocol may be a remote function call (RFC) protocol. Other examples, both proprietary and non-proprietary, are possible as well.

FIG. 7 also shows the central ERP client 702 having a connection with computational instance 322 of remote network management platform 320. Further, computational instance 322 is shown to include software application 706, which represents an application provided by computational instance 322 and configured to perform various operations relating to software asset management—namely, operations related to ERP software license compliance.

To facilitate this, computational instance 322 has a first connection with proxy servers 312 and proxy servers 312 have a second connection with the central ERP client 702, thereby creating the connection between computational instance 322 and the central ERP client 702. This connection between computational instance 322 and the central ERP client 702—or, more particularly, the second connection between proxy servers 312 and the central ERP client 702—is a type of external connection defined above and, in order for the external connection to be established, computational instance 322 and/or proxy servers 312 may require authorization to log on to the central ERP client 702. In some implementations, the first connection and the second connection can be active at the same time, although they do not have to be. For example, computational instance 322 can instruct proxy servers 312 to establish the second connection with the central ERP client 702 so that proxy servers 312 can in turn instruct the central ERP client 702 to retrieve the license data from the other ERP clients. The first connection can then be terminated and the second connection can be established.

Although communications between computational instance 322 and the central ERP client 702 are shown in FIG. 6 as occurring via proxy servers 312, it should be understood that, in other implementations, computational instance 322 can communicate directly with the central ERP client 702 without using proxy servers 312.

With computational instance 322, proxy servers 312, and the central ERP client 702 communicating as shown in FIG. 6, a user can use a web portal or application provided by computational instance 322, such as software application 706, to view or retrieve the license data stored in database 704, and perhaps provide various other instructions to the central ERP client 702. For example, computational instance 322 can transmit an instruction to proxy servers 312 and proxy servers 312 can then transmit the instruction to the central ERP client 702. The instruction can be a remote function call that causes the central ERP client 702 to transmit, to computational instance 322, the license data stored in the database 704. As such, when the central ERP client 702 receives the instruction from proxy servers 312, the central ERP client 702 can responsively transmit, to proxy servers 312, the license data. Proxy servers 312 can then transmit the license data to computational instance 322, either immediately after receiving the license data from the central ERP client 702 or after temporarily and locally storing the license data (e.g., in proxy servers 312).

Various other instructions can be transmitted to the central ERP client 702 in this same manner described above. Further, in some implementations, at least some of communications between computational instance 322, proxy servers 312, and the central ERP client 702 can be governed by the same communication protocol(s) described above.

As noted above, the process of the central ERP client 702 retrieving license data from other ERP clients can occur periodically at a pre-scheduled time (e.g., every night at 10:00 pm, or within 24 hours before an audit cycle) and/or can run in the background while other processes are being performed. To facilitate periodic retrieval of license data, computational instance 322 can provide a GUI that the user can use to set a frequency at which the central ERP client 702 retrieves license data from other ERP clients and makes the license data available to computational instance 322 (either by enabling the user to view the license data or by transmitting a copy of the license data to computational instance 322). When the user sets the frequency, computational instance 322 can transmit, to the central ERP client 702, a single instruction to retrieve the license data at the frequency. Alternatively, computational instance 322 can transmit, to the central ERP client 702, at the frequency, separate instructions to retrieve the license data. By having license data retrieved on a recurring basis, the enterprise can keep up-to-date with the most-recent license data.

A user can use computational instance 322 to cause the central ERP client 702 to perform other actions as well, some of which can relate to managing the license data. For example, computational instance 322 can provide a GUI through which the user can provide an input indicating an instruction to delete a specific portion of the license data currently being stored in the database 704. Thus, computational instance 322 can transmit the instruction to the central ERP client 702 and, in response, the central ERP client 702 can delete the specific portion of the license data.

VII. Example Improvement of User License Data a. Overview

As discussed above, mismanagement and/or misuse of an enterprise's ERP software licenses can cause an enterprise to become non-compliant. For example, the enterprise might be granted a number of licenses, yet allocate or use less than that number. Additionally or alternatively, more users may be accessing the ERP system, or using more of the ERP system's capabilities, than the number of licenses permits. Other examples are possible as well.

Thus, it is desirable for the enterprise to be able to efficiently maintain accurate up-to-date license data, particularly when the enterprise is large and/or the enterprise's use of ERP software changes over time. Doing so can help the enterprise be compliant with its licenses, and perhaps thereby reduce or eliminate costs associated with non-compliance.

The description in the previous section discussed how license data can be consolidated and stored at a central ERP client, and made available for use by a computational instance 322 of remote network management platform 320. Next, the following description discusses an improved remote network management platform that uses the consolidated license data discussed above to help administrators or other users improve ERP software license compliance.

In particular, the present disclosure further provides a software application that dynamically analyzes license data using criteria corresponding to specific non-compliance scenarios associated with the ERP software. Based on this analysis, the software application can also flag (e.g., store, in memory, an indication that identifies) these non-compliance scenarios and provide recommendations to administrators for improving compliance to fix the flagged non-compliance scenarios. The criteria used for the analysis can be uniquely tailored to fit licensing arrangements, audit cycle information, and/or other information related to the ERP software. Thus, by this process, the enterprise can efficiently and accurately track ERP software license compliance and efficiently address any non-compliance scenarios. The software application can perform other operations as well, as will be described in more detail below.

The software application can be executable on a computing device of a computational instance of remote network management platform 320 that is dedicated to managed network 300. Further, the software application can be provided by remote network management platform 320 as part of (e.g., as a module of), or separate from, a software asset management tool. For simplicity, software application 706 of computational instance 322 is described as an example of this software application. It should be understood, however, that, in other implementations, the software application that analyzes the license data, flags non-compliance scenarios, and/or performs other operations related to license compliance improvement may be distinct from software application 706.

For simplicity, software application 706 will be described below as being used by an administrator associated with managed network 300, such as an employee of the enterprise who is responsible for tracking license compliance. However, in practice, other users may be authorized to use software application 706.

In some implementations, software application 706 can be configured to provide one or more GUIs through which the administrator can perform various operations. Such operations can include, for example, (i) accessing and viewing the license data stored in the database 704 of the central ERP client 702, (ii) entering license information, such as information for newly purchased licenses, to be added to the license data, (iii) running an analysis on the license data using various criteria, and (iv) viewing results of the analysis, such as types of non-compliance and metrics associated therewith, among other possible options. License information that is entered and added by the administrator can include similar fields as the user-related data discussed above (e.g., an email address, a userid or another user identifier unique to the ERP system 600, type of license, date from/through which the license is valid, an indication of whether the user is a locked user, etc.) and may include other information as well.

The analysis of the license data can occur dynamically (e.g., as up-to-date license data is pulled from ERP clients to the central ERP client 702 and/or as the administrator adds new license information) and can occur in the background while other processes are being performed using software application 706 or other applications provided by computational instance 322. In some implementations, the results of the analysis can include a single GUI, such as a results summary page, that is dynamically updated with various metrics that correspond to one or more of the criteria used for the analysis. Additionally, in some implementations, the single GUI can include indications of how such metrics have changed over time. For example, if a total number of unlicensed users has dropped by ten over the past few days or few weeks, this could be indicated on the results summary page.

The license data can be analyzed per user, per ERP client (i.e., for all users of that ERP client), or for a group of users other than per ERP client. For example, the administrator can select an individual user and, using the criteria, run an analysis on that user to determine what licenses, if any, are required for that user. If the analysis results indicate that a user requires a license that the user does not currently have allocated, the administrator can then allocate the required license. As another example, the administrator can select a group of users (e.g., all the users of a particular ERP client, or all of the users in the enterprise) and run an analysis on the selected group of users to determine whether the group of users is compliant. The administrator can then take responsive action based on the results of the analysis. In either example, software application 706 can display or otherwise provide the administrator with metrics that might help the administrator determine whether a user, group of users, or the entire enterprise is compliant and also help the administrator determine how to reallocate licenses to maintain compliance. For example, if the enterprise is over-licensed by a particular quantity of licenses, the enterprise can then reduce the quantity of licenses it holds. Other examples are possible as well.

In some implementations, software application 706 can provide other options for analyzing the license data. For example, software application 706 can enable the administrator to select a particular type of license (e.g., select a particular license level) or a particular type of user (e.g., select by job title, department, type of user communication with the ERP system 600, or other criteria defined by the enterprise and/or the provider of the ERP software) and then run an analysis on a portion of the license data that corresponds to the selected type of license or type of user. The results of the analysis might indicate whether the enterprise is compliant with respect to the selected type of license or type of user, and might indicate other information as well.

Each of the criteria used for analyzing the license data can correspond to a respective non-compliance scenario and can uniquely address issues that can arise in those scenarios. These criteria will now be discussed in more detail, along with a description of the manners in which software application 706 advantageously addresses and resolves these unique issues.

b. Criteria for Analyzing User License Data i. No License Allocated to User Who Requires a License As discussed above, some types of user communication with an ERP client might require a license. In some scenarios, although a user might be engaged in communication with the ERP system 600 that requires a license, the enterprise might not have allocated a license to that user, either intentionally or inadvertently. As a result, the enterprise might not be compliant with respect to that user.

This can present other disadvantages as well. For example, during an audit cycle, when the provider of the ERP software comes across this user, the provider might treat the user as having been allocated a license that is more expensive (e.g., a higher level license) or otherwise less desirable than another license that is better suited for being allocated to the user. As a more particular example, consider two licenses: License A and License B. License A is more expensive than License B, but License B, if allocated to the user, would authorize the user to perform the activities the enterprise wants the user to perform. Still, when the provider audits the enterprise and sees no license allocated to the user, the provider might treat the user as having been allocated License A.

Thus, to address this issue, the criteria used in analyzing the license data can involve identifying users who are involved in user communication with the ERP system 600 that require a license, but to whom no license is currently allocated. That way, the administrator can resolve the issue with respect to each such user, such as by deleting the user's account or userid, allocating an unused, lesser-used, or lower level license to the user, among other possibilities.

To facilitate this, for example, the license data might indicate, in one field for a particular user, that the user's communication with the ERP system 600 is classified as a type of communication that requires a license. In addition, either the license data might indicate, in another field for the user, that the user does not currently have a license allocated (e.g., a field indicating which licenses are allocated to the user might be empty or say "None"). As such, software application 706 can search the license data and identify users such as this.

Further, in some implementations, software application 706 can calculate a total number of users identified with this criterion and display the total number, such as on the results summary page.

ii. Users Who Do Not Require a License

In contrast to the user communication discussed in the preceding section, some types of user communication with an ERP client might not require a license, such as communication involving a computing device performing background processes involving the ERP client. For simplicity, user communication with the ERP system 600 that does not require a license will be referred to as "exempt communication." During an audit cycle, the provider of the ERP software might come across a user of the ERP software who engages in exempt communication. However, for various reasons, the provider might treat that user as having been allocated a license and thus require the enterprise to pay for a license for that user.

For example, consider a situation in which user-related data for the user indicates that the user engages in communication with the ERP system 600, but the user-related data does not classify the user's communication with the ERP system 600 as a type of exempt communication. Because the user is not classified as being involved in exempt communication, the provider may assume that the user should have been allocated a license. The provider doing this can be particularly problematic in scenarios where the license that the provider treats as having been allocated to the user is a high level license, which might incur additional costs to the enterprise.

Thus, to address this issue, the criteria used in analyzing the license data can involve identifying users who are involved in exempt communication with the ERP system 600. That way, the administrator can resolve the issue with respect to each such user, such as by properly classifying the user, deleting the user's account or userid, or allocating an unused or lesser-used license to the user, among other possibilities.

To facilitate this, for example, software application 706 can search the license data to find user-related data for a user that classifies the user's communication with the ERP system 600 as exempt communication. Other examples are possible as well.

Further, in some implementations, software application 706 can calculate a total number of users identified with this criterion and display the total number, such as on the results summary page.

Additionally, in some scenarios, a user might be engaged only in exempt communication with the ERP system 600, yet the enterprise might intentionally or inadvertently allocate a license to the user. This allocation of an unnecessary license can cause the enterprise to be non-compliant as well and might incur an extra cost to the enterprise.

Thus, to address this issue as well, additional criteria used in analyzing the license data can involve more particularly identifying users who (i) are involved in exempt communication with the ERP system 600 and (ii) have been allocated a license. That way, the administrator can resolve the issue with respect to each such user, such as by reallocating the license to another user, among other possibilities.

To facilitate this, for example, software application 706 can search the license data to find user-related data for a user that classifies the user's communication with the ERP system 600 as exempt communication, but that indicates that a license has been allocated to the user. Other examples are possible as well.

Further, in some implementations, software application 706 can calculate a total number of users identified with this additional criterion and display the total number, such as on the results summary page.

iii. ERP Clients that Do Not Require Licenses

As discussed above, each ERP client of the ERP system 600 can be dedicated for use in carrying out particular activities, such as a training client, a development client, and a testing client. However, in some licensing arrangements, certain such ERP clients, such as training clients and testing clients, might not require licenses. For simplicity, such ERP clients will be referred to as "exempt ERP clients."

In some scenarios, the enterprise might intentionally or inadvertently allocate a license to a user who is only accessing one or more exempt ERP clients. As a result, the enterprise's compliance data might be inaccurate, and the enterprise might end up reporting the license to the provider of the ERP software during an audit cycle. In some cases, this can in turn result in the enterprise paying for the license when the license might not be required.

Thus, to address this issue, the criteria used in analyzing the license data can involve identifying exempt ERP clients. The criteria can also involve, for each exempt ERP client, identifying which users of the exempt ERP client have an allocated license and are only accessing exempt ERP clients. That way, the administrator can monitor exempt ERP clients and users thereof, and can reallocate licenses away from such users if necessary.

To facilitate this, for example, software application 706 might have access to a list of exempt ERP clients. Then, for each exempt ERP client, software application 706 can (i) identify users whose user-related data indicates that the user has been allocated a license and only accesses exempt ERP clients and (ii) flag that user. Other examples are possible as well.

Further, in some implementations, software application 706 can calculate a total number of users of exempt ERP clients to whom licenses are currently allocated and display the total number, such as on the results summary page.

iv. Restricted Users

As discussed above, when a user to whom a license is allocated is no longer employed by the enterprise or is otherwise restricted from accessing the ERP system 600, the enterprise might temporarily or permanently change the user-related data for that user to indicate that the restricted user is a locked user, as discussed above. For simplicity, such a user will be referred to as a "restricted user." However, even though the enterprise might indicate that the restricted user is a locked user, the enterprise might decide to keep the restricted user's account active for a particular period of time (e.g., days, weeks, or months). One reason the enterprise might do this is that the enterprise might need at least a portion of the data associated with the account, and it might take time for the enterprise to determine which portion(s) of the data to keep or delete. Other reasons are possible as well.

Still, the enterprise locking the restricted user and keeping the restricted user's account might not terminate the license that had been allocated to the restricted user. Rather, the license might be reported as an ongoing license until the expiration date for that license—namely, the date through which the license is valid—is reached. In addition, until the expiration date is reached, the user-related data for the restricted user might continue to indicate that the license is allocated to the restricted user.

In order to terminate the license, the enterprise might be required to update, in the user-related data for the restricted user, the date through which the license is valid. However, the enterprise might not be aware of this, or might forget to do so.

This is another example of how the enterprise's compliance data can become inaccurate. Further, in some cases, this might result in the enterprise paying for the license longer than needed.

Thus, to address this issue, the criteria used in analyzing the license data can involve identifying restricted users who are currently consuming a license. As such, the administrator can be efficiently notified as to which restricted users are causing the enterprise to be non-compliant.

To facilitate this, for example, software application 706 might determine, from a user's user-related data, that (i) the user is a locked user, (ii) the user has a license allocated, and (iii) the date through which the license is valid has not yet passed. Software application 706 can then flag that user as a restricted user who is currently consuming a license. Other examples are possible as well.

Further, in some implementations, software application 706 can calculate a total number of restricted users who are currently consuming a license and display the total number, such as on the results summary page.

v. Inactive Users

In some scenarios, a user might not have logged on to an ERP client (or to multiple ERP clients that the user is licensed to use) in a long period of time, such as one month, three months, six months, or a year. For simplicity, such a user will be referred to as an "inactive user." In these scenarios, it might not be desirable for the enterprise to continue to have a license or licenses allocated to the inactive user.

Thus, to address this issue, the criteria used in analyzing the license data can involve identifying inactive users. By identifying inactive users, the enterprise can determine how to reallocate or eliminate ongoing licenses for those inactive users. For example, another user might make better use of a license than an inactive user. Other examples are possible as well.

To facilitate this, for example, software application 706 can be configured to (i) determine, from a user's user-related data, the date/time at which the user last logged onto the ERP client (or to the ERP system in general) and (ii) compare the date/time to a threshold time period. If software application 706 determines that the user has not logged on in a time period that exceeds the threshold time period, software application 706 can flag the user as an inactive user. For instance, software application 706 can be configured to identify a user as an inactive user when the user has not logged on in over a threshold time period of ninety days. Other example thresholds are possible. The threshold time period can be a default threshold and, in some implementations, software application 706 can provide a GUI that enables the administrator to set the threshold time period as desired.

Further, in some implementations, software application 706 can calculate a total number of inactive users and display the total number, such as on the results summary page.

vi. Incorrect Level of License Allocated to User

As discussed above, some higher level licenses and some lower level licenses can overlap in scope. In some scenarios, the enterprise might seek to authorize a user to perform a particular activity. However, instead of allocating to the user a lower level license that authorizes the user to perform the activity, the enterprise might intentionally or inadvertently allocate to the user a higher level license that also authorizes the user to perform the activity, but that authorizes the user to perform various other activities that the user need not perform. As a result of the user being allocated a license level that is not required for the user, the enterprise's compliance might be less than desired. Further, in some cases, the higher level licensee might cost more than the lower level license, and thus the enterprise might end up paying more than necessary.

To address this issue, the criteria used in analyzing the license data can involve identifying users to whom higher level licenses are allocated. To facilitate this, for example, software application 706 can automatically select, or enable the administrator to select, from a range of lowest level to a highest level, which level(s) of licenses can be used for this identification. In some implementations, software application 706 can identify users having allocated licenses with levels that are higher than a threshold. In any case, software application 706 can search the license data and determine which users have the selected license level(s) allocated. That way, the administrator can see which users have higher level licenses and determine, based on other user-related data and/or other information, whether those users are involved in activities with the ERP system 600 that can instead be authorized by a lower level license. The administrator can then reallocate licenses as needed.

Further, in some implementations, software application 706 can calculate a total number of users to whom higher level licenses (e.g., more particularly, the highest level of licenses) are currently allocated and display the total number, such as on the results summary page.

To even further assist in addressing this issue, in some implementations, the license data can include, or software application 706 can otherwise have access to, a field of data that indicates the activities that each level of license authorizes users to perform. For simplicity, this data will be referred to as "authorized activities." In such implementations, the criteria used in analyzing the license data can involve identifying, to an even more accurate degree, which users have higher-than-needed levels of licenses allocated. To facilitate this, for example, software application 706 can look at the different levels of licenses allocated to a particular user, search the authorized activities for each such license, determine whether a higher level license allocated to the user is associated with the same authorized activity as a lower level license that is also allocated to the user, and flag users who meet that criteria. Software application 706 can then make the result of this analysis available for the administrator to view. For example, software application 706 can list flagged users and, for each flagged user, list licenses allocated to that user, indicate the respective levels of those licenses, and visually emphasize which authorized activity is common between two or more levels of licenses allocated to the user. Other examples are possible as well.

Optionally, regardless of how many users have been flagged as meeting this criteria, software application 706 can provide a GUI or series of GUIs that the administrator can use to select a particular license level and see a list of the authorized activities for the selected license level.

vii. Defined ERP User Types

In some implementations, the enterprise, the provider of the ERP software, or a coalition thereof, might define different types of users of the ERP system 600 (hereinafter, "ERP user type") and whether each such ERP user type is licensable—that is, whether a user classified as having the ERP user type requires a license. For example, a first such ERP user type can include users who develop software for the ERP system 600, and the first ERP user type might be non-licensable. Thus, users who develop software for the ERP system 600 might be assigned the first ERP user type or otherwise classified as having the first ERP user type. In addition, a second, different ERP user type can include users who engage in exempt communication with the ERP system 600, and the second ERP user type might be non-licensable. Thus, users who engage in exempt communication with the ERP system 600 might be assigned the second ERP user type or otherwise classified as having the second ERP user type. Other ERP user types are possible as well.

Thus, ERP user types can be another of the criteria used in analyzing the license data. In particular, ERP user types can be utilized as a way to indicate to software application 706 whether software application 706 should consider certain users in performing a compliance analysis. For example, in some implementations, while software application 706 is performing the analysis of the license data, users having ERP user types that are non-licensable can be skipped or otherwise ignored. Thus, the analysis might be completed more quickly and using less computational resources, thereby further improving efficiency of the analysis.

As an example of how software application 706 can determine whether a given ERP user type is licensable, user-related data for a user might include the ERP user type as well as a field indicating whether the ERP user type is licensable (e.g., a field including, or not including, the value, is_licensable. Other examples are possible as well.

Alternatively, the enterprise might not desire to skip or ignore any users. One reason for this is that a user classified with a non-licensable ERP user type might have accidentally been allocated a license, and thus the enterprise would want to make sure this situation was detected during the analysis rather than skipped. In this scenario, software application 706 can check at least three portions of a user's user-related data: the ERP user type, whether the ERP user type is licensable, and whether the user has an allocated license.

As noted above, software application 706 can enable the administrator to select a particular type of user on which to run the analysis. In some implementations, the analysis can be run per ERP user type and software application 706 can determine and display whether each selected ERP user type is compliant. In addition, software application 706 might also determine and display other information with respect to each selected ERP user type, examples of which are described in more detail below.

Further, in some implementations, software application 706 might calculate a total number of ERP user types in the enterprise that are non-compliant and display the total number, such as on the results summary page.

Moreover, in some implementations, it can be desirable to track which users of the ERP system 600 do not currently have an ERP user type assigned. One reason for this is that the enterprise might decide to utilize ERP user types as a way to more efficiently keep track of compliance and organize license data with another level of granularity. For instance, the enterprise might use ERP user types as a basis for filtering users when evaluating compliance results, or for other reasons. Regardless, for at least these reasons, software application 706 can identify users of the ERP system 600 to whom no ERP user type is assigned. In addition, software application 706 might calculate a total number of such users and display the total number, such as on the results summary page.

c. Additional Example Analysis Results

In some implementations, software application 706 can use at least a portion of the criteria discussed above to calculate and display metrics associated with different non-compliance scenarios. These metrics can include, for example, an estimated true-up cost (e.g., how much the enterprise must pay in additional licensing to become compliant), estimated potential savings (e.g., how much money the enterprise can potentially save by reallocating licenses, deleting accounts of inactive users, etc.), and an estimated over-licensed amount (e.g., a total cost of licenses that the enterprise is not using or otherwise is not currently required to hold), among other possibilities. For example, software application 706 can determine which users are inactive users and determine a total cost of licenses allocated to the inactive users. This total cost can thus represent an estimated over-licensed amount, or can be one of multiple calculations made to determine the estimated over-licensed amount. To facilitate this and other examples, software application 706 can store or otherwise have access to data that indicates the cost of each license held by the enterprise and can refer to this data when calculating the metrics noted above.

d. Example GUIs

Figure 8:
FIG. 8 depicts an example graphical user interface (GUI), in accordance with example embodiments.

FIG. 8 depicts a first example GUI 800 that software application 706 can provide to enable the administrator to view user-related data in the license data stored at the central ERP client 702. For example, the first example GUI 800 includes a portion of a list of users of the ERP software in managed network 300. In particular, user-related data are shown for a particular user, User X, including various fields described above (e.g., userid, a date from which the user's license is valid, a date through which the user's license is valid, etc.). Although not shown, the first example GUI 800 might also include text boxes or other means for enabling the administrator to search and filter the list of users of ERP software.

Figure 9:
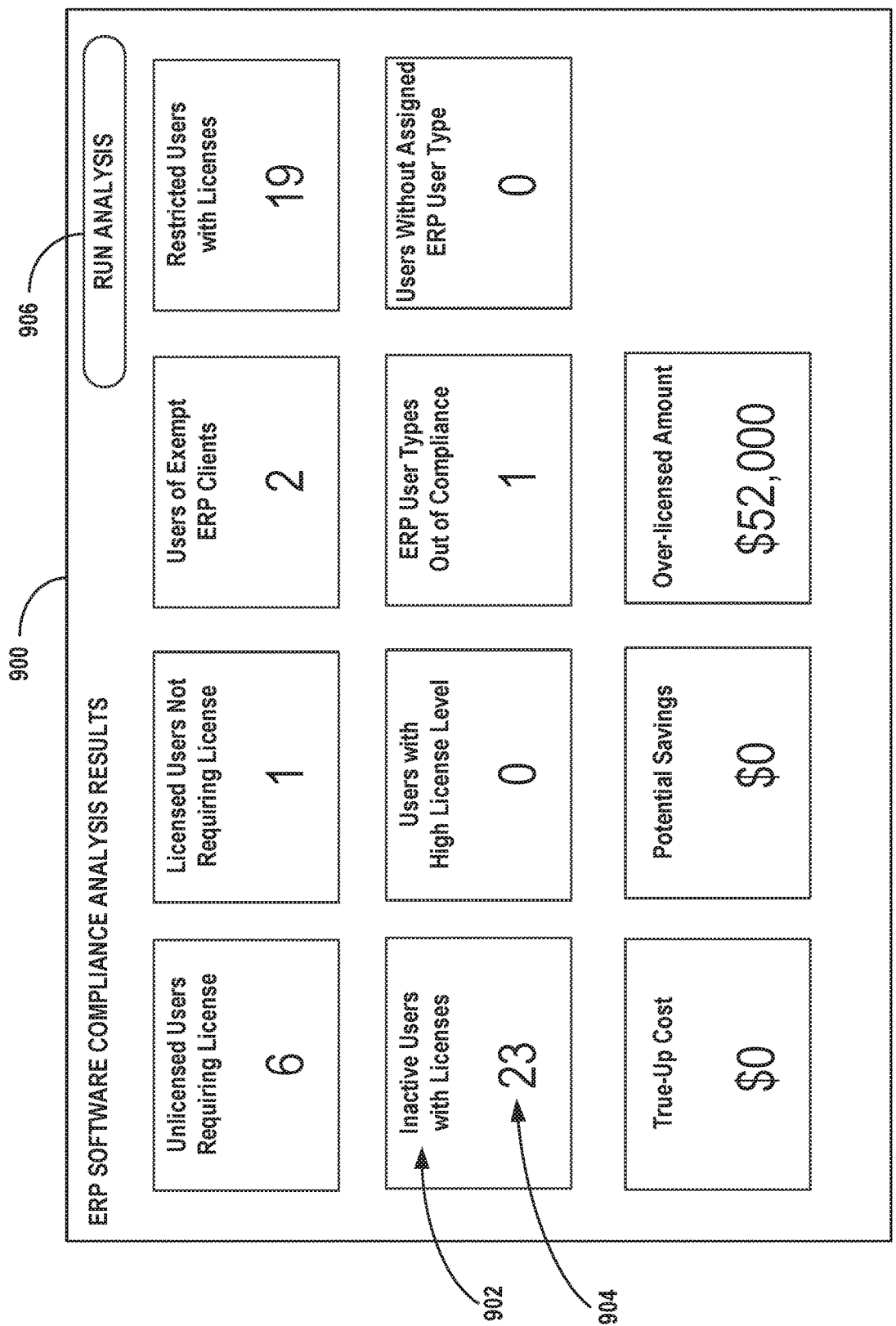
FIG. 9 depicts another example GUI, in accordance with example embodiments.

FIG. 9 depicts a second example GUI 900 that software application 706 can provide. In particular, the second example GUI 900 is an example form that the results summary page could take. As shown, and in line with the description above, the results summary page includes total numbers in a variety of fields. Seven of the fields correspond to the criteria described above. For example, field 902 is denoted as "Inactive Users with Licenses," and its corresponding number 904 represents a total number of inactive users in managed network 300 to whom licenses are currently allocated. Other fields include metrics such as true-up cost, potential savings, and over-licensed amount. In operation, software application 706 can dynamically update one or more of the numbers shown in the second example GUI 900 using the most-recent license data from the central ERP client 702. Additionally, the second example GUI 900 also includes a selectable option 906 that, when selected via user input, causes software application 706 to run the above-described compliance analysis.

In some implementations, one or more regions of the second example GUI 900 can be selectable to cause software application 706 to provide related GUIs. For example, field 902 and/or number 904 can be a selectable link that, when selected, causes software application 706 to display a new GUI that provides additional details regarding inactive users who have been allocated licenses, such as a list of the users who meet that particular criterion. That way, the administrator, if desired, can acquire additional details and better evaluate the enterprise's compliance position. Other examples are possible as well.

Figure 10:
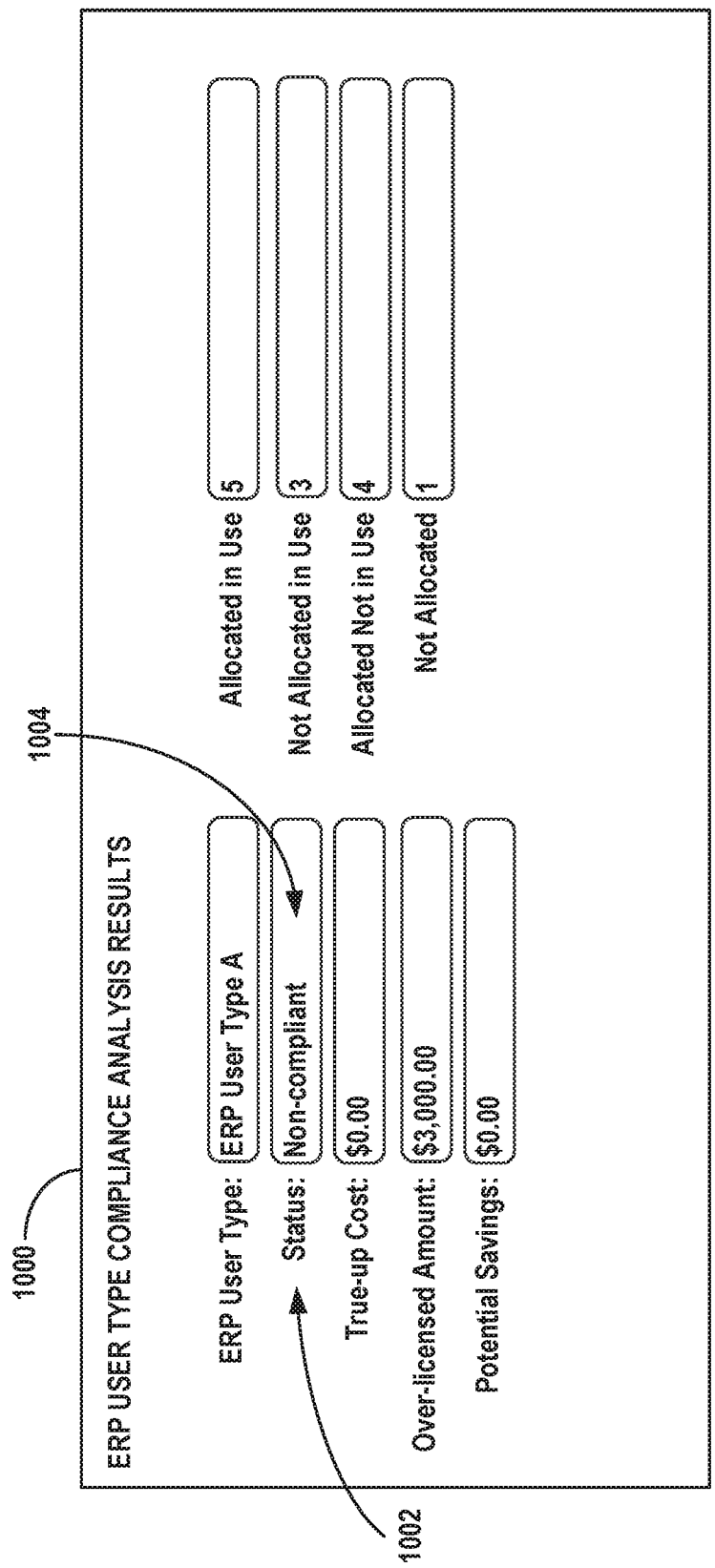
FIG. 10 depicts another example GUI, in accordance with example embodiments.

FIG. 10 depicts a third example GUI 1000 that software application 706 can provide. In particular, the third example GUI 1000 is an example of a page that the administrator can view to determine compliance results associated with a particular ERP user type—namely, ERP User Type A, for example. As shown, the third example GUI 1000 includes a variety of fields and corresponding values, including some of the fields described above. For example, field 1002 is a "Status" field having a value 1004 of "Non-compliant," thus indicating to the administrator that, with respect to ERP User Type A, the enterprise is non-compliant (e.g., due to being over-licensed by an amount of $52,000).

Other fields are shown as well, including but not limited to "Allocated in Use" (e.g., a number of users who are accessing the ERP system 600 and to whom the enterprise has allocated licenses), "Not Allocated in Use" (e.g., a number of users who are accessing the ERP system 600, but to whom the enterprise has not allocated licenses), "Allocated Not in Use" (e.g., a number of users to whom the enterprise has allocated licenses, but who are not accessing the ERP system 600), and "Not Allocated" (e.g., a number of licenses that the enterprise has not yet allocated to users). Each of these fields has a value corresponding to an example scenario where the enterprise has purchased ten licenses for ERP User Type A. Particularly, in this scenario, nine of those ten licenses may be allocated to users, five of which are in use and four of which are not in use. One of those ten licenses may not have been allocated to a user. In addition, there may be three users to whom none of the ten licenses have been allocated, yet who are still accessing the ERP system 600. Other example scenarios are possible as well.

The fields shown in the third example GUI 1000 can be defined (e.g., created or customized) by the enterprise, the provider of the ERP software, or a combination thereof. Other fields are possible as well.

Examples described above include over-licensing as an example of non-compliance with ERP software. However, it should be understood that, in some cases, being over-licensed might not be considered to be an example of non-compliance.

VIII. Example Operations

Figure 11:
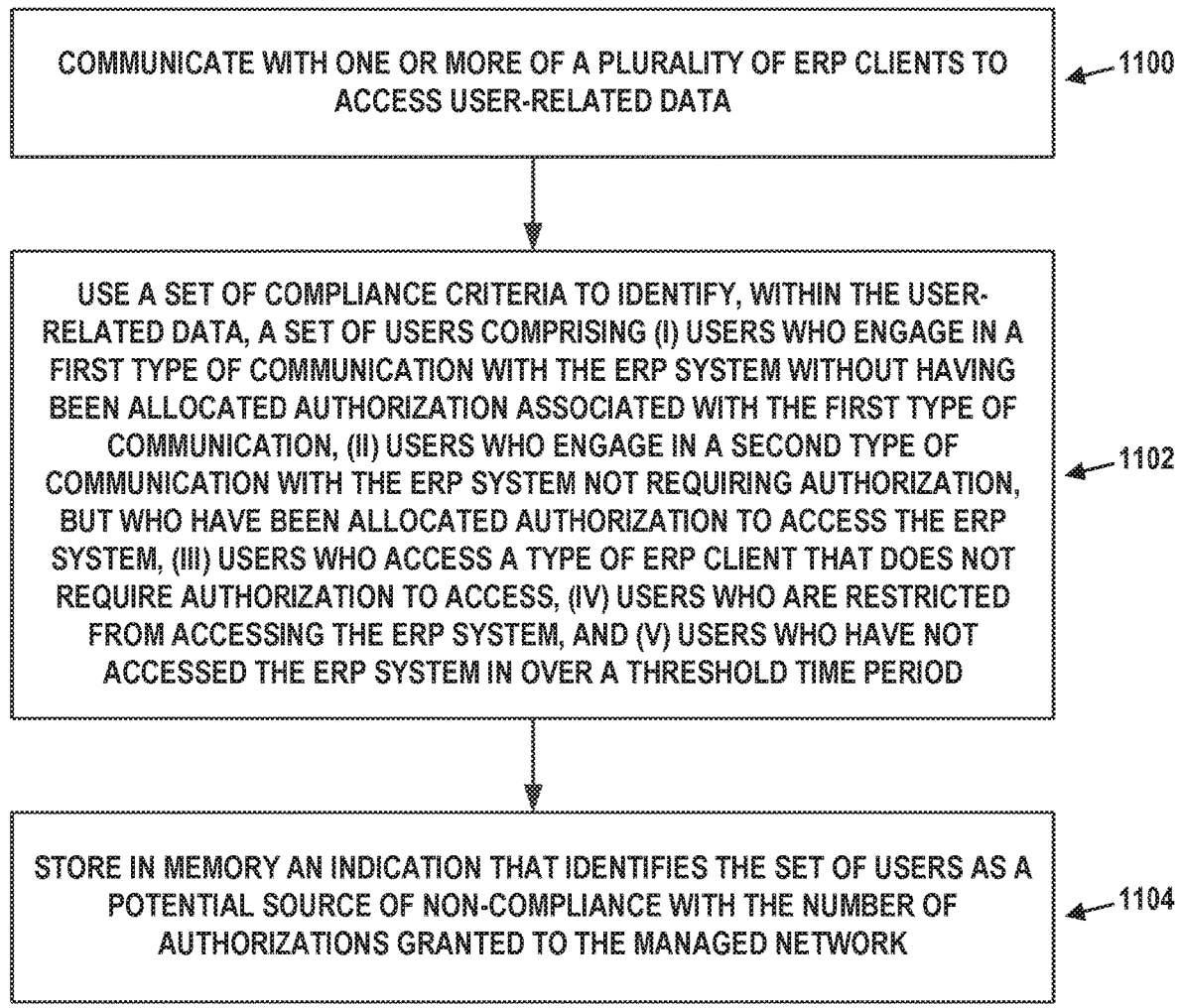
FIG. 11 is a flow chart, in accordance with example embodiments.

FIG. 11 is a flow chart illustrating one of several possible example embodiments. The embodiments of FIG. 11 may be simplified by the removal of any one or more of the features shown therein. Further, these embodiments may be combined with features, aspects, and/or implementations of any of the previous figures or otherwise described herein.

The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

For the purposes of example, the process illustrated by FIG. 11 will be described as being carried out by a software application, such as software application 706, that is executable on a computing device of a computational instance (e.g., computational instance 322) of a remote network management platform (e.g., remote network management platform 320).

Block 1100 involves communicating with one or more of a plurality of ERP clients to access user-related data. The remote network management platform may be associated with a managed network. The managed network may contain an ERP system comprised of the plurality of ERP clients. Each ERP client may be associated with one or more computing devices of the managed network on which ERP software is executable. The managed network may be granted a number of authorizations to access the ERP system and capabilities thereof. The ERP system may store the user-related data, and the user-related data may contain a list of identifiers of individual users of the managed network who access the ERP system and the capabilities thereof.

Block 1102 involves using a set of compliance criteria to identify, within the user-related data, a set of users comprising (i) users who engage in a first type of communication with the ERP system without having been allocated authorization associated with the first type of communication, (ii) users who engage in a second type of communication with the ERP system not requiring authorization, but who have been allocated authorization to access the ERP system, (iii) users who access a type of ERP client that does not require authorization to access, (iv) users who are restricted from accessing the ERP system, and (v) users who have not accessed the ERP system in over a threshold time period.

Block 1104 involves storing in memory an indication that identifies the set of users as a potential source of noncompliance with the number of authorizations granted to the managed network.

In some embodiments, the act of communicating with one or more of the ERP clients to access the user-related data can involve transmitting, to one or more of the ERP clients, a request for the user-related data to include a set of fields and corresponding data entries related to user accounts with the ERP system, and obtaining, from one or more of the ERP clients, a response including the set of fields and the corresponding data entries related to user accounts with the ERP system. The set of fields can include, for each user of the ERP system, (i) a type of communication with the ERP system that the user engages in, (ii) authorizations currently allocated to the user, and (iii) a date or time at which the user last logged on to the ERP system. Additionally, in some implementations, the set of fields can further include, for each user of the ERP system, (i) a userid for the user, (ii) a date through which the authorizations currently allocated to the user are valid, and (iii) whether the user has been restricted from accessing the ERP system.

In such embodiments, the act of using the set of compliance criteria to identify, within the user-related data, the set of users can involve parsing the corresponding data entries in the set of fields to identify the set of users. Further, each compliance criterion of the set of compliance criteria can specify which fields of the set of fields the software application parses to identify users who meet that compliance criterion.

In some embodiments, the number of authorizations can include a first authorization granting access to a first set of the capabilities of the ERP system and a second authorization granting access to a second set of the capabilities of the ERP system. The first set of the capabilities can include more capabilities than the second set of the capabilities. The first set of the capabilities and the second set of the capabilities can each include a particular shared capability. In such embodiments, the set of users can further comprise a user who only accessed the shared capability but has been allocated the first authorization.

In some embodiments, the user-related data can include a plurality of ERP user types that define respective types of users of the ERP system. Authorization to access the ERP system might be required for at least one of the ERP user types, and authorization to access the ERP system might not be required for at least one of the ERP user types. In such embodiments, the set of users can further comprise a user assigned one of the ERP user types for which authorization to access the ERP system is not required.

In some embodiments, the user-related data can include a plurality of ERP user types that define respective types of users of the ERP system. Authorization to access the ERP system might be required for at least one of the ERP user types, and authorization to access the ERP system might not be required for at least one of the ERP user types. In such embodiments, the set of users can further comprise a user to whom no ERP user type has been assigned.

In some embodiments, the first type of communication with the ERP system can include interactive communication between a user and the ERP system, and the second type of communication with the ERP system can include a computing device of the managed network performing a background process involving the ERP system.

In some embodiments, the type of ERP client that does not require authorization to access can include one or more of: a first type of ERP client used for training users how to access and use the ERP software, or a second type of ERP client used for testing software applications developed using a programming language provided by the ERP software.

In some embodiments, the act of identifying users who are restricted from accessing the ERP system can involve identifying a user (i) who is restricted from accessing the ERP system, (ii) who has been allocated authorization to access the ERP system, and (iii) whose allocated authorization is currently valid.

In some embodiments, the process can further involve generating and providing, for display on a graphical user interface, a results summary page including, in distinct regions of the results summary page, (i) a total number of users who engage in a first type of communication with the ERP system without having been allocated authorization associated with the first type of communication, (ii) a total number of users who engage in a second type of communication with the ERP system not requiring authorization, but who have been allocated authorization to access the ERP system, (iii) a total number of users who access a type of ERP client that does not require authorization to access, (iv) a total number of users who are restricted from accessing the ERP system, and (v) a total number of users who have not accessed the ERP system in over the threshold time period. In addition, the process can also involve dynamically updating the total numbers included in the results summary page as the user-related data changes over time.

Further, the results summary page may also include, in distinct regions of the results summary page, (i) an estimated true-up amount of additional authorizations to add to the number of authorizations for the managed network to become compliant, (ii) an estimated amount for potential savings on the number of authorizations held by the managed network, and (iii) an estimated over-authorization amount associated with at least one authorization that is granted to the managed network but not required to access the ERP system. As such, the process can involve dynamically updating the estimated true-up amount, the estimated amount for potential savings, and the estimated over-authorization amount in the results summary page as the user-related data changes over time.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a remote network management platform associated with a managed network and containing a computational instance, wherein the managed network contains an enterprise resource planning (ERP) system comprised of a plurality of ERP clients, wherein each ERP client is associated with one or more computing devices of the managed network on which ERP software is executable, wherein the managed network is granted one or more licenses to access the ERP system and capabilities thereof, and wherein the ERP system stores user-related data containing a list of identifiers of individual users of the managed network who access the ERP system and the capabilities thereof; and
   a software application, executable on a computing device of the computational instance and configured to:
      perform, automatically via one or more proxy servers and an Internet Protocol (IP) address range corresponding to the one or more computing devices, a discovery operation to obtain discovery data indicative of the one or more computing devices, wherein the one or more proxy servers are configured to:
         transmit one or more probes to the one or more computing devices; and
         receive one or more responses from the one or more computing devices to obtain the discovery data;
      communicate with one or more of the ERP clients associated with the one or more computing devices to access the user-related data;
      use a set of compliance criteria to identify, within the user-related data and based on the discovery data, a set of users comprising (i) users who engage in a first type of communication with the ERP system without having been allocated a first type of license of the one or more licenses associated with the first type of communication, (ii) users who engage in a second type of communication with the ERP system not requiring the one or more licenses, but who have been allocated a second type of license of the one or more licenses to access the ERP system, (iii) users who access a type of ERP client that does not require the one or more licenses to access, (iv) users who are restricted from accessing the ERP system, and (v) users who have not accessed the ERP system in over a threshold time period;
      store in memory an indication that identifies the set of users as a potential source of non-compliance with the one or more licenses granted to the managed network.

2. The system of claim 1, wherein communicating with one or more of the ERP clients to access the user-related data comprises:
   transmitting, to one or more of the ERP clients, a request for the user-related data to include a set of fields and corresponding data entries related to user accounts with the ERP system, wherein the set of fields includes, for each user of the ERP system, (i) a type of communication with the ERP system that the user engages in, (ii) licenses currently allocated to the user, and (iii) a date or time at which the user last logged on to the ERP system; and
   obtaining, from one or more of the ERP clients, a response including the set of fields and the corresponding data entries related to user accounts with the ERP system,
   wherein using the set of compliance criteria to identify, within the user-related data, the set of users comprises parsing the corresponding data entries in the set of fields to identify the set of users, and
   wherein each compliance criterion of the set of compliance criteria specifies which fields of the set of fields the software application parses to identify users who meet that compliance criterion.

3. The system of claim 2, wherein the set of fields includes, for each user of the ERP system, (i) a userid for the user, (ii) a date through which the licenses currently allocated to the user are valid, and (iii) whether the user has been restricted from accessing the ERP system.

4. The system of claim 1, wherein the one or more licenses includes a first license granting access to a first set of the capabilities of the ERP system and a second license granting access to a second set of the capabilities of the ERP system,
wherein the first set of the capabilities includes more capabilities than the second set of the capabilities,
wherein the first set of the capabilities and the second set of the capabilities each includes a particular shared capability, and
wherein the set of users comprises a user who only accessed the shared capability but has been allocated the first license.

5. The system of claim 1, wherein the first type of communication with the ERP system comprises interactive communication between a user and the ERP system, and
wherein the second type of communication with the ERP system comprises a computing device of the managed network performing a background process involving the ERP system.

6. The system of claim 1, wherein the type of ERP client that does not require the one or more licenses to access comprises one or more of: a first type of ERP client used for training users how to access and use the ERP software, or a second type of ERP client used for testing software applications developed using a programming language provided by the ERP software.

7. The system of claim 1, wherein identifying users who are restricted from accessing the ERP system comprises identifying a user (i) who is restricted from accessing the ERP system, (ii) who has been allocated at least one license of the one or more licenses, and (iii) whose at least one license is currently valid.

8. The system of claim 1, wherein the software application is configured to:
generate a graphical user interface comprising a results summary page including, in distinct regions of the results summary page, (i) a total number of users who engage in the first type of communication, (ii) a total number of users who engage in the second type of communication, (iii) a total number of users who access a type of ERP client that does not require the one or more licenses to access, (iv) a total number of users who are restricted from accessing the ERP system, and (v) a total number of users who have not accessed the ERP system in over the threshold time period; and
automatically update the total numbers included in the results summary page as the user-related data changes over time.

9. The system of claim 8, wherein the results summary page includes, in distinct regions of the results summary page, (i) an estimated true-up amount of additional licenses to add to the one or more licenses for the managed network to become compliant, (ii) an estimated amount for potential savings on the one or more licenses held by the managed network, and (iii) an estimated over-authorization amount associated with at least one license that is granted to the managed network but not required to access the ERP system, and
wherein the software application is configured to automatically update the estimated true-up amount, the estimated amount for potential savings, and the estimated over-authorization amount in the results summary page as the user-related data changes over time.

10. The system of claim 1, wherein the software application is provided by a third-party that does not operate the managed network.

11. The system of claim 1, wherein the software application is configured to:
receive, via the GUI, user input indicative of a periodic frequency for accessing the user-related data; and
communicate with the one or more of the ERP clients at the periodic frequency to access the user-related data.

12. The system of claim 1, wherein the one or more proxy servers are configured to transmit the probes in response to one or more tasks being placed in a task list, and wherein the one or more tasks comprise instructions to discover the one or more computing devices corresponding to the IP address range.

13. The system of claim 1, wherein the one or more proxy servers are configured to probe each IP address in the IP address range to determine a type of each computing device of the one or more computing devices, and wherein the discovery data comprises the type of each computing device of the one or more computing devices.

14. The system of claim 1, wherein the discovery data obtained, via the one or more probes transmitted to the one or more computing devices, comprises information associated with the ERP software executable on the one or more computing devices.

15. A method comprising:
performing, automatically via one or more proxy servers and an Internet Protocol (IP) address range corresponding to one or more computing devices of a managed network, a discovery operation to obtain discovery data indicative of the one or more computing devices, wherein the one or more proxy servers are configured to:
transmit one or more probes to the one or more computing devices; and
receive one or more responses from the one or more computing devices to obtain the discovery data;
communicating, by a software application executable on a computing device of a computational instance of a remote network management platform, with one or more of a plurality of enterprise resource planning (ERP) clients to access user-related data, wherein the remote network management platform is associated with the managed network, wherein the managed network contains an ERP system comprised of the plurality of ERP clients, wherein each ERP client is associated with the one or more computing devices of the managed network on which ERP software is executable, wherein the managed network is granted one or more licenses to access the ERP system and capabilities thereof, wherein the ERP system stores the user-related data, and wherein the user-related data contains a list of identifiers of individual users of the managed network who access the ERP system and the capabilities thereof;
using a set of compliance criteria to identify, within the user-related data and based on the discovery data, a set of users comprising (i) users who engage in a first type of communication with the ERP system without having been allocated a first type of license of the one or more licenses associated with the first type of communication, (ii) users who engage in a second type of communication with the ERP system not requiring the one or more licenses, but who have been allocated a second type of license of the one or more licenses to access the ERP system, (iii) users who access a type of ERP client that does not require the one or more licenses to access, (iv) users who are restricted from accessing the ERP system, and (v) users who have not accessed the ERP system in over a threshold time period;

storing in memory an indication that identifies the set of users as a potential source of non-compliance with the one or more licenses granted to the managed network;

generating a graphical user interface (GUI) comprising a results summary page including (i) a first number of the users who engage in the first type of communication, (ii) a second number of the users who engage in the second type of communication, (iii) a third number of the users who access the type of ERP client that does not require the one or more licenses to access, (iv) a fourth number of the users who are restricted from accessing the ERP system, and (v) a fifth number of the users who have not accessed the ERP system in over the threshold time period; and automatically updating the first number, the second number, the third number, the fourth number, the fifth number, or any combination thereof, in the results summary page as the user-related data changes over time.

16. The method of claim 15, wherein communicating with one or more of the plurality of ERP clients to access the user-related data comprises:

transmitting, to one or more of the plurality of ERP clients, a request for the user-related data to include a set of fields and corresponding data entries related to user accounts with the ERP system, wherein the set of fields includes, for each user of the ERP system, (i) a type of communication with the ERP system that the user engages in, (ii) licenses currently allocated to the user, and (iii) a date or time at which the user last logged on to the ERP system; and obtaining, from one or more of the plurality of ERP clients, a response including the set of fields and the corresponding data entries related to user accounts with the ERP system, wherein using the set of compliance criteria to identify, within the user-related data, the set of users comprises parsing the corresponding data entries in the set of fields to identify the set of users, and wherein each compliance criterion of the set of compliance criteria specifies which fields of the set of fields the software application parses to identify users who meet that compliance criterion.

17. The method of claim 15, wherein the one or more licenses includes a first license granting access to a first set of the capabilities of the ERP system and a second license granting access to a second set of the capabilities of the ERP system, wherein the first set of the capabilities includes more capabilities than the second set of the capabilities, wherein the first set of the capabilities and the second set of the capabilities each includes a particular shared capability, and wherein the set of users comprises a user who only accessed the shared capability but has been allocated the first license.

18. The method of claim 15, wherein the user-related data includes a plurality of ERP user types that define respective types of users of the ERP system, wherein the one or more licenses are required for at least one of the ERP user types to access the ERP system, wherein the one or more licenses are not required for at least one of the ERP user types to access the ERP system, and wherein the set of users comprises a user assigned one of the ERP user types for which the one or more licenses are not required to access the ERP system.

19. An article of manufacture including a non-transitory computer-readable medium, having stored thereon program instructions that, upon execution by a computing device of a computational instance of a remote network management platform, cause the computing device to perform operations comprising:

performing, automatically via one or more proxy servers and an Internet Protocol (IP) address range corresponding to the one or more computing devices, a discovery operation to obtain discovery data indicative of one or more computing devices of the managed network, wherein the one or more proxy servers are configured to:

transmit one or more probes to the one or more computing devices; and receive one or more responses from the one or more computing devices to obtain the discovery data;

communicating with one or more of a plurality of enterprise resource planning (ERP) clients to access user-related data, wherein the remote network management platform is associated with a managed network, wherein the managed network contains an ERP system comprised of the plurality of ERP clients, wherein each ERP client is associated with at least one of the one or more computing devices of the managed network on which ERP software is executable, wherein the managed network is granted one or more licenses to access the ERP system and capabilities thereof, wherein the ERP system stores the user-related data, and wherein the user-related data contains a list of identifiers of individual users of the managed network who access the ERP system and the capabilities thereof;

using a set of compliance criteria to identify, within the user-related data and based on the discovery data, a set of users comprising (i) users who engage in a first type of communication with the ERP system without having been allocated a first type of license of the one or more licenses associated with the first type of communication, (ii) users who engage in a second type of communication with the ERP system not requiring the one or more licenses, but who have been allocated a second type of license of the one or more licenses to access the ERP system, (iii) users who access a type of ERP client that does not require the one or more licenses to access, (iv) users who are restricted from accessing the ERP system, and (v) users who have not accessed the ERP system in over a threshold time period;

storing in memory an indication that identifies the set of users as a potential source of non-compliance with the one or more licenses granted to the managed network;

generating a graphical user interface (GUI) comprising a results summary page including (i) a first number of the users who engage in the first type of communication, (ii) a second number of the users who engage in the second type of communication, (iii) a third number of the users who access the type of ERP client that does not require the one or more licenses to access, (iv) a fourth number of the users who are restricted from accessing the ERP system, and (v) a fifth number of the users who have not accessed the ERP system in over the threshold time period; and automatically updating the first number, the second number, the third number, the fourth number, the fifth number, or any combination thereof, in the results summary page as the user-related data changes over time.

20. The article of manufacture of claim 19, wherein communicating with one or more of the plurality of ERP clients to access the user-related data comprises:
transmitting, to one or more of the plurality of ERP clients, a request for the user-related data to include a set of fields and corresponding data entries related to user accounts with the ERP system, wherein the set of fields includes, for each user of the ERP system, (i) a type of communication with the ERP system that the user engages in, (ii) licenses currently allocated to the user, and (iii) a date or time at which the user last logged on to the ERP system; and
obtaining, from one or more of the plurality of ERP clients, a response including the set of fields and the corresponding data entries related to user accounts with the ERP system,
wherein using the set of compliance criteria to identify, within the user-related data, the set of users comprises parsing the corresponding data entries in the set of fields to identify the set of users, and
wherein each compliance criterion of the set of compliance criteria specifies which fields of the set of fields the software application parses to identify users who meet that compliance criterion.

* * * * *

UNITED STATES PATENT AND TRADEMARK OFFICE
CERTIFICATE OF CORRECTION

PATENT NO. : 11,410,101 B2
APPLICATION NO. : 16/249709
DATED : August 9, 2022
INVENTOR(S) : Prashanth Mudhelli It is certified that error appears in the above-identified patent and that said Letters Patent is hereby corrected as shown below:

In the Claims

Column 38, Line 42, Claim 1; insert --and-- after the ";".

Column 38, Line 66, Claim 2; insert --respective-- between "each" and "compliance".

Column 39, Line 2, Claim 2; replace "that" with --the respective--.

Column 39, Line 18, Claim 4; insert --particular-- before "shared".

Column 39, Line 44, Claim 8; insert --the-- before "users".

Column 39, Line 46, Claim 8; insert --the-- before "users".

Column 39, Line 47, Claim 8; insert --the-- before "users".

Column 39, Line 48, Claim 8; replace "access a type" with --access the type--.

Column 39, Line 49, Claim 8; insert --the-- before "users".

Column 39, Line 51, Claim 8; insert --the-- before "users".

Column 39, Line 53, Claim 8; insert --each of-- after "update", and insert --of the users-- before "included".

Column 39, Line 57, Claim 9; insert --the-- between "in" and "distinct".

Column 40, Line 9, Claim 11; replace "the GUI" with --a graphical user interface (GUI)--.

Column 40, Line 14, Claim 12; insert --one or more-- before "probes".

Signed and Sealed this
Twenty-fifth Day of April, 2023

Katherine Kelly Vidal
*Director of the United States Patent and Trademark Office*

CERTIFICATE OF CORRECTION (continued)
U.S. Pat. No. 11,410,101 B2

Column 41, Line 46, Claim 16; insert --respective-- after "each".

Column 41, Line 49, Claim 16; replace "that" with --the respective--.

Column 41, Line 61, Claim 17; insert --particular-- before "shared".

Column 42, Line 15, Claim 19; remove "the" and insert --of a managed network-- after "computing devices".

Column 42, Line 16, Claim 19; insert --the-- before "one".

Column 43, Line 26, Claim 20; insert --respective-- before "compliance".

Column 43, Line 28, Claim 20; replace "software application" with --computing device--.

Column 43, Line 29, Claim 20; replace "that" with --the respective--.